Nov. 17, 1970  R. V. DAVIDGE ET AL  3,540,133
AUDIO VISUAL TEACHING MACHINE
Filed Sept. 20, 1968  6 Sheets-Sheet 1
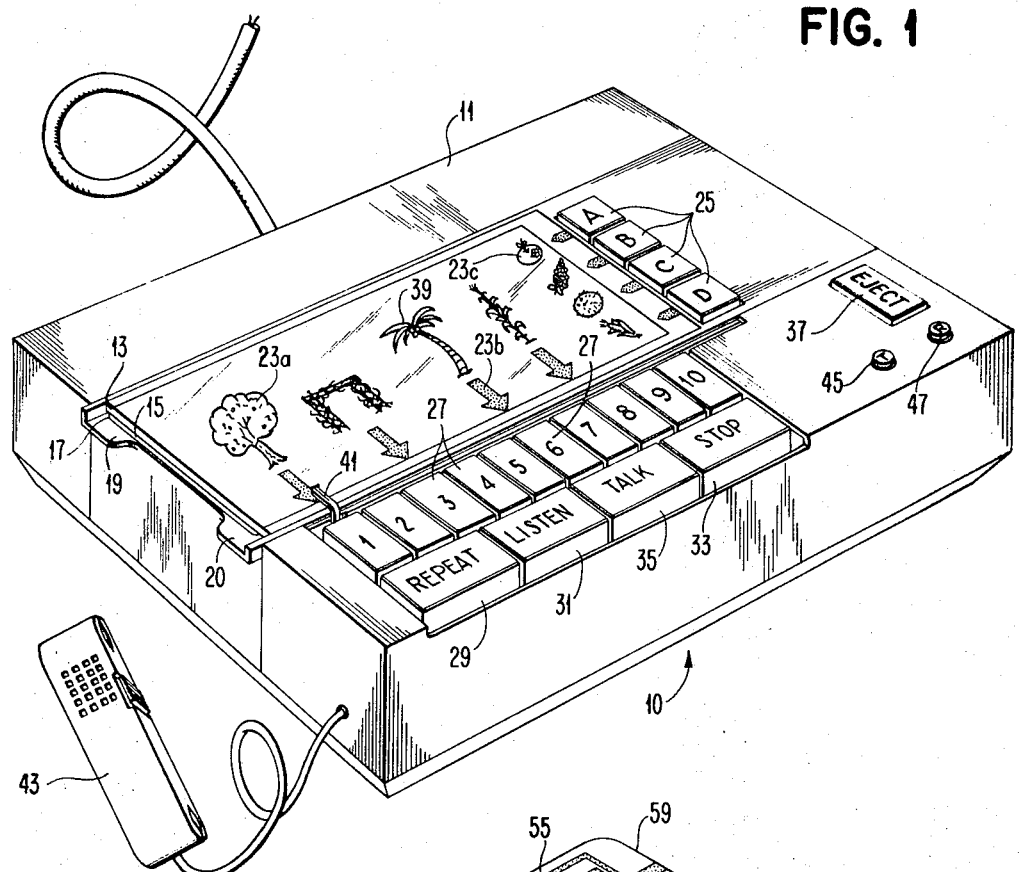
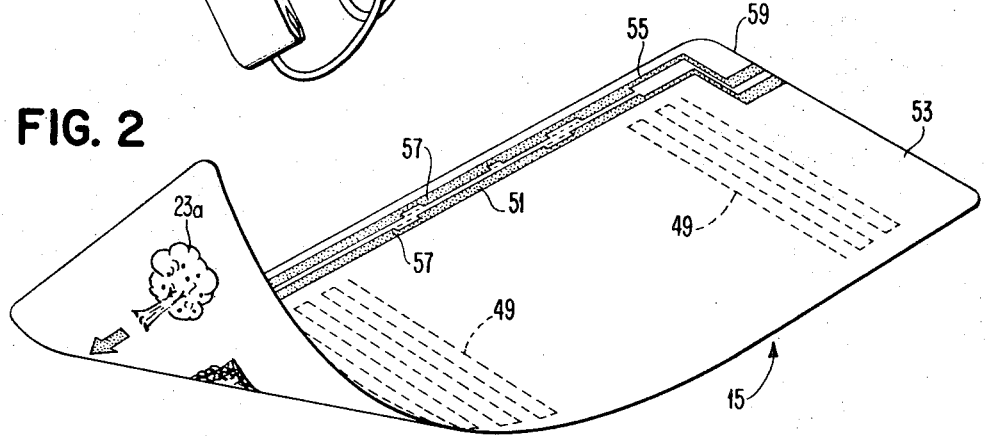
INVENTORS.
RONALD V. DAVIDGE
ROBERT A. KOLPEK
BY John W Girvin, Jr.
ATTORNEY.

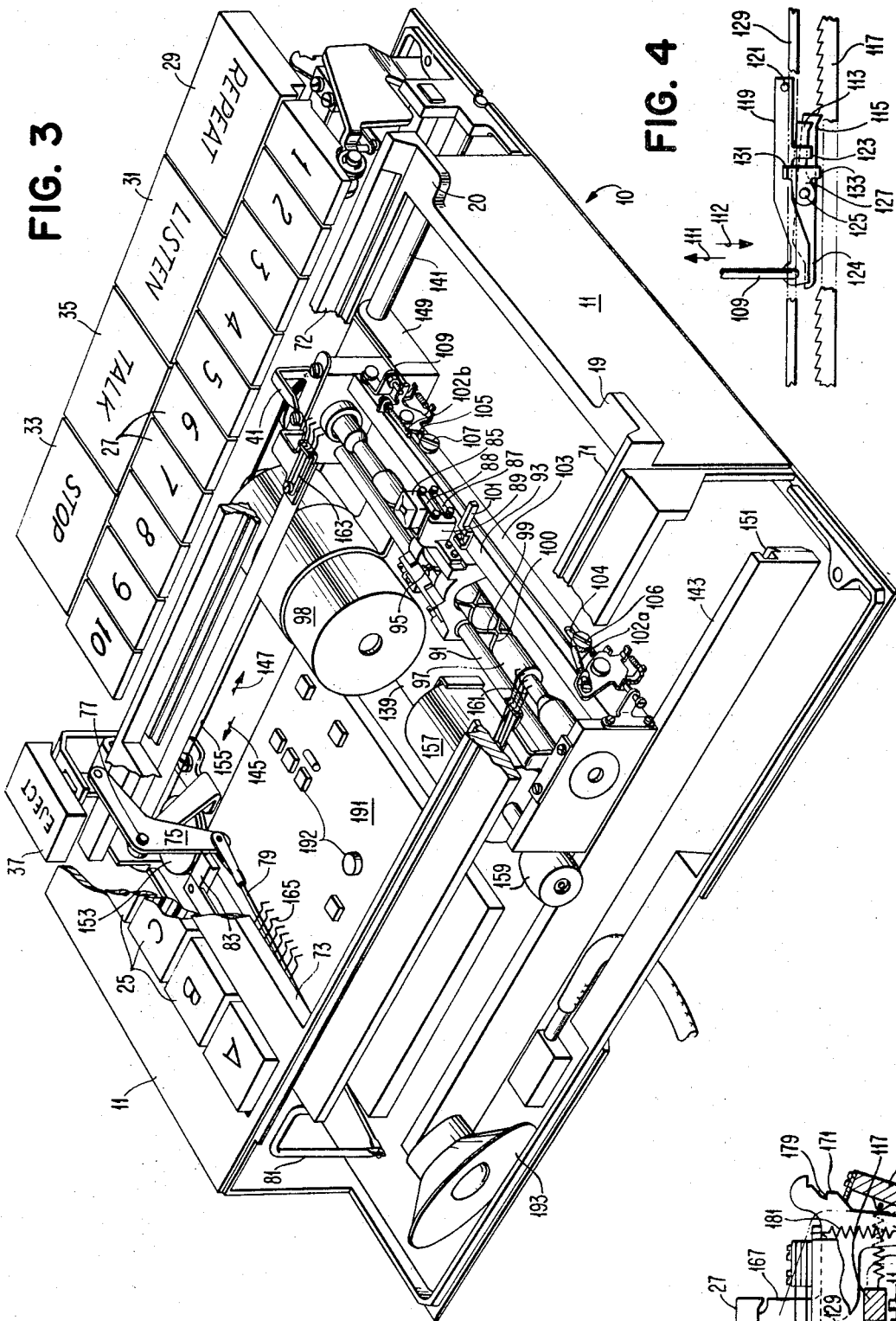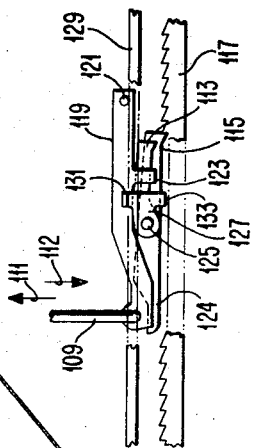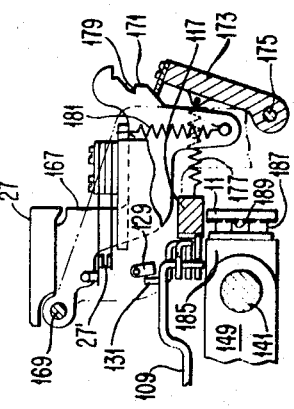

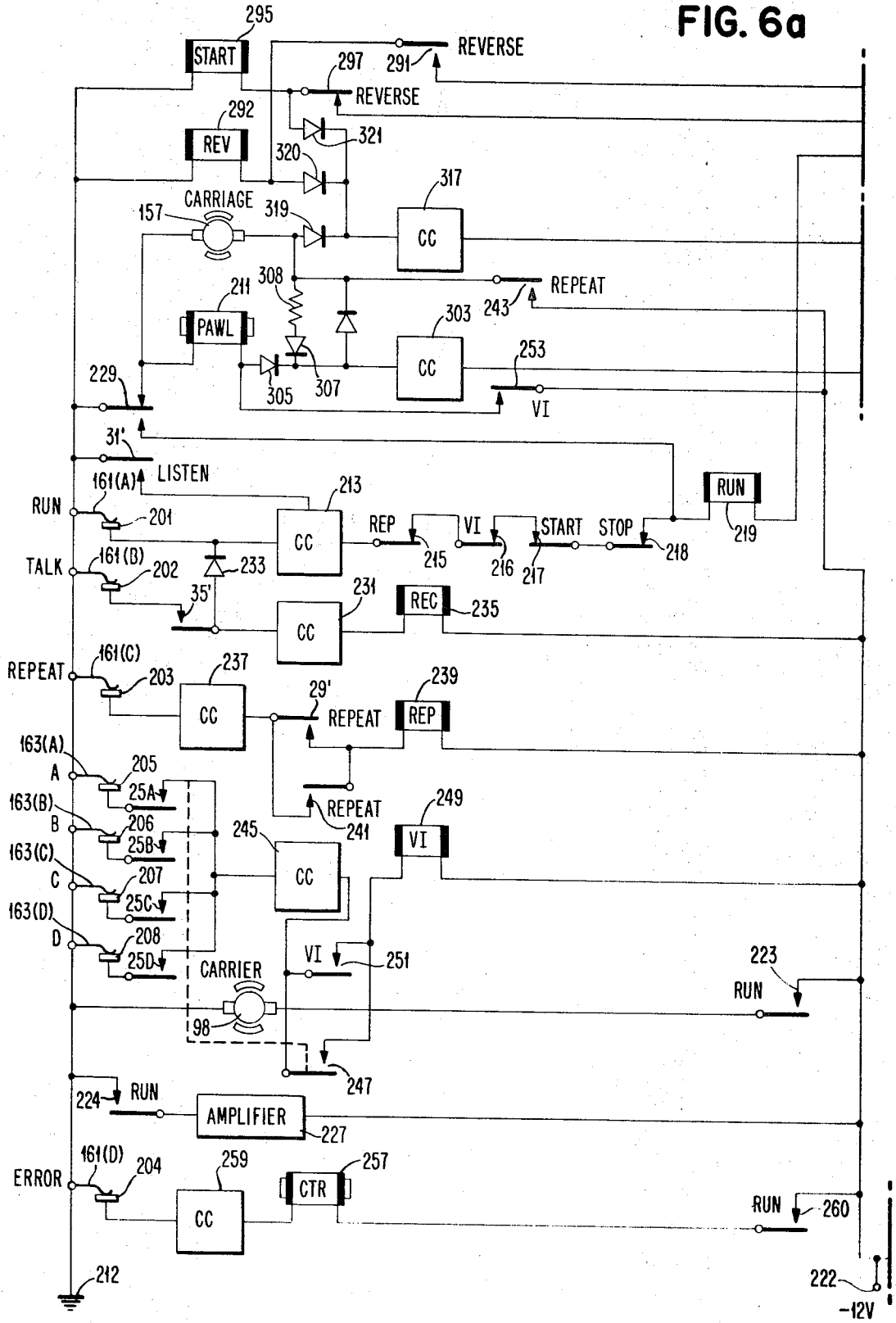

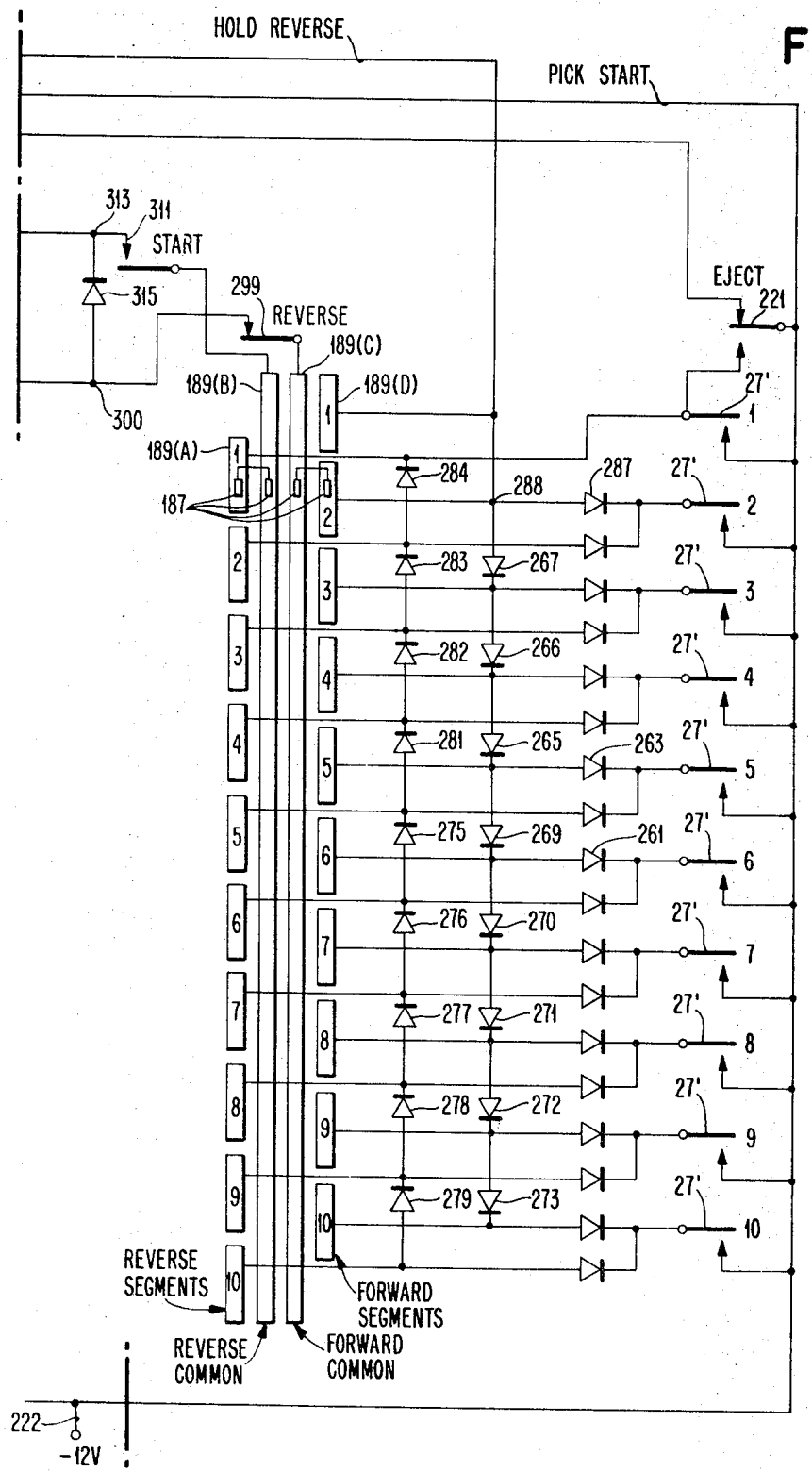

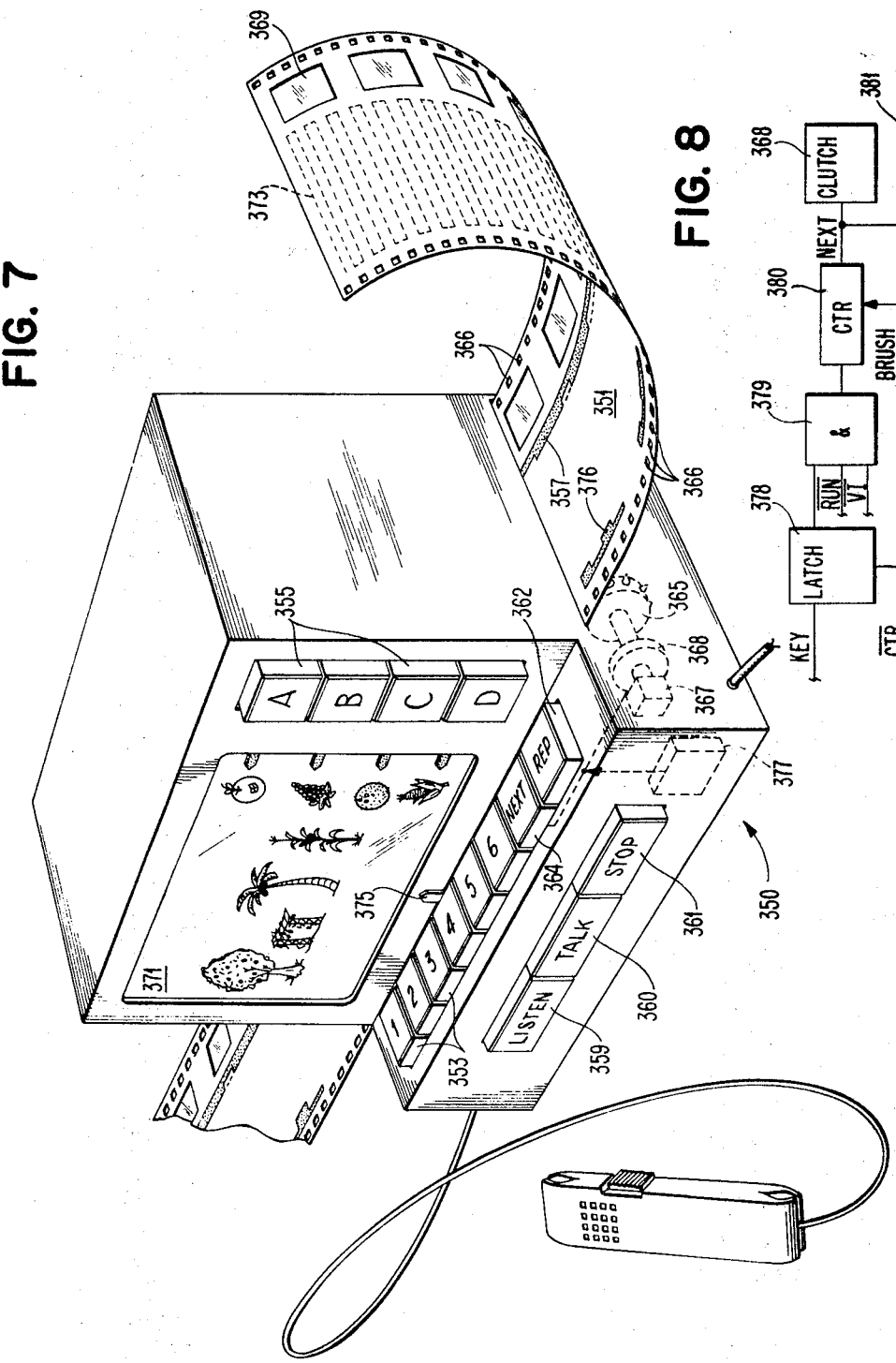
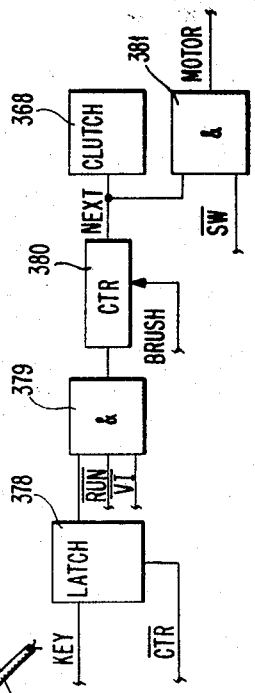

United States Patent Office 3,540,133
Patented Nov. 17, 1970

3,540,133
AUDIO VISUAL TEACHING MACHINE
Ronald V. Davidge and Robert A. Kolpek, Lexington, Ky., assignors to International Business Machines Corporation, Armonk, N.Y., a corporation of New York
Filed Sept. 20, 1968, Ser. No. 761,225
Int. Cl. G09b 7/12
U.S. Cl. 35—9                                                10 Claims

ABSTRACT OF THE DISCLOSURE

A teaching machine utilizing a single medium containing audio and visual stimuli, programming information, and oral and/or digital response areas. Means, for example, keybuttons are provided for the student to enter answers, a representation of which may be recorded on the medium. Depression of a keybutton may effect a programmed index to portions of the medium containing an audio reinforcement for the selected student answer. An automatic programmed index to the next problem selected by the programmer in accordance with the previous answer may thereafter be effected. By depressing a repeat keybutton, the student may go back to the start position determined by the programmer. Fixed indexing keybuttons allows the student to go forward or backward within the program on his own volition. The student may also make oral responses. A unique cartridge feed device is also described which eliminates student handling of the medium.

CROSS REFERENCES TO RELATED APPLICATIONS

The following applications are all assigned to the same assignee as the present application.

U.S. patent application Ser. No. 609,232, filed Jan. 13, 1967, entitled "Transducer Driving Arrangement For Reading and Reproducing Apparatus," William L. Dollenmayer, inventor, now U.S. Pat. 3,471,654, issued Oct. 7, 1969.

U.S. patent application Ser. No. 623,053, filed Mar. 14, 1967, entitled "Data System With Printing, Composing, Communications, and Magnetic Card Processing Facilities," Robert A. Kolpek, inventor, now abandoned.

U.S. patent application Ser. No. 697,735, filed Jan. 15, 1968, entitled "Data Reading, Recording, and Positioning System," Douglas E. Clancy, George W. Hobgood, Jr. and Frederick T. May, inventors.

BRIEF BACKGROUND OF THE INVENTION

Field

The present invention relates to audiovisual teaching machines and, more particularly, to a programable self-contained unit which presents audiovisual stimuli to the student and which is responsive to keybutton responses of the student to effect fixed or program controlled indexing to an associated reinforcement and/or a succeeding problem.

Description of the prior art

Prior art audio visual teaching machines fall into two general categories: computer assisted units and stand-alone units. Computer assisted units generally comprise a student station containing a plurality of randomly accessible audio and visual stimuli and student response means and a remote computer containing a program which is responsive to the student response means to select a visual and audio stimuli at the student station in accordance with the program. The computer program allows both linear branching and non-linear branching; that is, the stimuli presented to the student may have no dependency upon the correctness of the response or it may be dependent solely upon the response of the student to the previous stimuli. Such devices are obviously complex and costly, although they can be readily programmed to effect all forms of linear and non-linear branching.

Stand-alone audio visual devices generally comprise audio and visual stimuli which are presented to the student in a fixed or linear manner. The student is usually presented with some factual information and then asked to respond to a question. A correct response causes the program to advance to the next problem or frame of information while an incorrect response activates an alarm mechanism. There are, however, several prior art devices wherein non-linear branching can be effected. In such devices, information is generally presented to the student and he is asked a question. By depressing one of a plurality of response keys, the medium is indexed to a subsequent or prior frame of learning material containing a corresponding reinforcement which is generally in the form of remedial learning material for incorrect responses and a further problem for correct responses. Since the only way that such devices can progress to a subsequent frame of learning material is by student depression of a keybutton in response to a question, these machines are limited in the type and form of learning material that can be presented.

Further, it is often desirous to allow the student to select the next problem within a limited set of problems upon his own volition or to allow the student to repeat information upon his own volition. Those prior art stand-alone teaching machines which effect non-linear branching have no means associated therewith for the student to over-ride the program to a limited extent and go either forward or backward in a lesson to a desired location which is selected either by the student or by the programmer.

An additional problem presented by prior art stand-alone teaching machines is that they generally allow for only one type of student response. That is, they either have selection keybuttons associated therewith for responding to multiple choice type questions or they are in the form of a language learning machine wherein the student makes an oral response after hearing a master record thereby trying to imitate the master record. A further type of teaching machine presents construction programs wherein a series of instructions are presented to the student who responds to each instruction by utilizing materials on hand to construct an object in accordance with the program. Devices for presenting such construction programs are also special purpose machines having means for automatically stopping the program at the end of an instruction and/or presenting the next instruction upon student initiation of a starting device. The prior art stand-alone teaching machines are not capable of being programmed to present all three types of teaching programs: multiple choice, oral response, and construction programs.

SUMMARY

In order to overcome the above problems and shortcomings of the prior art and to provide a stand-alone teaching machine wherein construction, oral response, and multiple choice programs can be presented in random manner and wherein non-linear branching or linear branching can be effected in accordance with student responses to an appropriate reinforcement area and wherein the student has limited control to over-rid the program in order to learn remedial information or information previously presented, the teaching machine of the present invention is provided with a recording device with fixed and variable student activated indexing means and with automatic program branching means which are intricately associated with the audiovisual medium.

The teaching machine of the present invention utilizes a medium which contains audio, visual, and program material. A series of fixed indexing keybuttons are provided so that the student can index to fixed positions on the medium. Additionally, a series of variable indexing keybuttons are provided so that the student can index to positions on the medium determined in accordance with the program material on the medium. By pushing a repeat keybutton, the student can go back to a start position determined by the programmer. Further, the programmer can effect automatic indexing from any position of the medium to any other position of the medium.

An additional feature of the device is that it will automatically stop at positions determined by the programmer or the student can cause it to stop at any point by depressing a stop keybutton. The student may thereafter restart a stopped machine by indexing to a new position or by depressing a start keybutton. Additionally, the student can record his oral response to the program on portions of the media set aside for this purpose by the programmer. The prerecorded portions of the medium are protected from the student's recording.

Through the use of the above enumerated features, the machine can be used for the presentation of the following types of programs which can be intermixed on the same medium in any manner.

(A) Multiple choice program

The student may answer multiple choice questions by depressing index keybuttons which index to portions of the audiovisual program containing the reinforcements for his answers (e.g. portions telling him whether he is right or wrong and why) and thereafter automatically be presented with a next appropriate problem. The student response to each question can be readily recorded.

(B) Construction programs

The machine automatically stops after asking the student to perform an auxiliary operation, such as writing in a workbook. After performing this operation, the student restarts the machine by pushing an appropriate keybutton. The student may be asked to repeat certain segments of the program by depressing either the fixed or variable indexing keybuttons.

(C) Voice programs

The machine asks the student to repeat a phrase or otherwise record an oral response through the use of the talk keybutton. He can then go back and hear his own recording through use of the repeat and listen keybuttons.

The foregoing and other features and advantages of the invention will be apparent from the following more particular description of the preferred embodiments of the invention as illustrated in the accompanying drawings.

In the drawings:

FIG. 1 is a perspective view of a teaching machine constructed in accordance with the present invention.

FIG. 2 is a perspective view of the programmed audiovisual medium for use in the teaching machine of FIG. 1.

FIG. 3 is a perspective view partially in section of the teaching machine of FIG. 1.

FIG. 4 is an elevation view of the carriage escapement mechanism of the teaching machine of FIGS. 1 and 3.

FIG. 5 is a partial cross-sectional view of the fixed indexing buttons and their associated mechanism of the teaching machine of FIGS. 1 and 3.

FIGS. 6a and 6b are schematic circuit diagrams of the teaching machine of FIG. 1.

FIG. 7 is a perspective view of an alternate embodiment of the teaching machine constructed in accordance with the present invention.

FIG. 8 is a schematic block diagram of a circuit of the teaching machine of FIG. 7.

Figure 9:
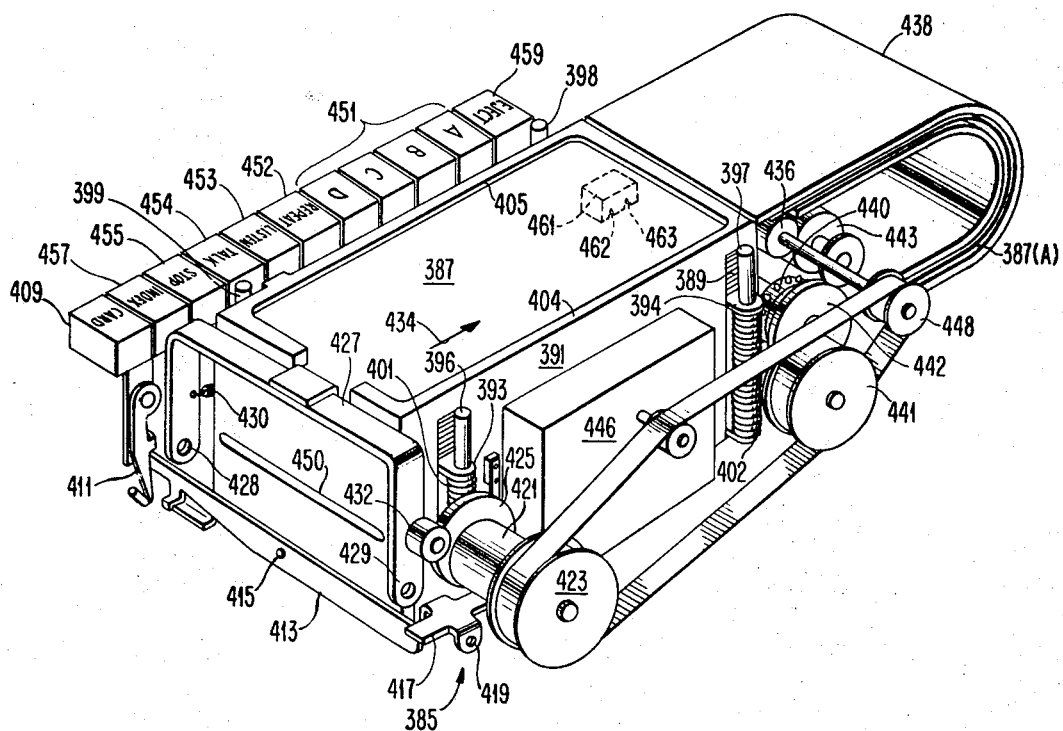
FIG. 9 is a perspective view partially in section of a pack feeding device adapted for use with a teaching machine constructed in accordance with the present invention.

Referring now to FIG. 1, a perspective view of a teaching machine constructed in accordance with the present invention is depicted. The teaching machine 10 includes an outer housing 11 having, on its top surface, a transparent shield 13 under which the medium 15 containing the audio visual information and the programming information is placed. An opening 17 is provided in the side wall of the outer housing 11 immediately under the transparent shield 13 through which the medium 15 is inserted by the student. Flanges 19 and 20 aid in properly guiding the medium into the opening 17. The top-most surface of the medium 15 contains visual indicia 23 imprinted thereon and the underside of the medium contains audio information and programming information recorded thereon as will be explained hereinafter.

The teaching machine 10 is further provided with a first plurality of lettered keybuttons 25, a second plurality of numbered keybuttons 27, a repeat keybutton 29, a listen keybutton 31, a stop keybutton 33, a talk keybutton 35, and an eject card keybutton 37. The lettered keybuttons 25 are utilized by the student, as will be explained hereinafter, to respond to questions presented to the student and to effect non-linear programmed branching to an appropriate audio reinforcement area. The numbered keybuttons are utilized by the student to effect branching to an audio presentation position as determined by the student. For example, if the student desired to hear the audio information corresponding to the visual indicia 39, he would depress the numbered keybuton 27, labeled "6." This would cause the indicator 41 to move to a position adjacent to the depressed keybutton and to the visual indicia 23(b) and thereafter, the audio information corresponding to the visual indicia 39 would be heard by the student. The initial position of the indicator 41 is immaterial and hence, forward and reverse indexing can be thus effected.

The repeat keybutton 29 can be depressed by the student if he desires to relisten to audio information previously presented. The programmer programs the medium as will later be described so that only a predetermined portion of the audio material, as determined by the programmer, is repeated. The listen keybutton 31 may be depressed whenever the machine 10 is stopped. Depression of this keybutton initiates the playback of prerecorded audio messages from the medium 15. The stop keybutton 33 may be depressed at any time by the student in order to stop the playback of the prerecorded audio messages. The talk keybutton 35 is depressed whenever the student wishes to record audio information. A microphone 43 is provided for the student to record the audio information onto the medium 15. Depression of the eject card keybutton 37 causes the medium 15 to be partially ejected through the opening 17 when it is desirous to replace the medium 15 with medium containing additional learning material. The indicator lamps 45 and 47 indicate respectively that the teaching machine 10 is in talk mode or that the teaching machine is waiting for the student to respond to a presented question by depressing a keybutton.

Referring now to FIG. 2, the programmed audiovisual medium 15 is depicted. As indicated above, visual indicia 23 appears on one surface of the medium while the audio information 49 and program information 51 appear on its opposite surface 53. Surface 53 consists of a magnetic oxide particle coated surface adapted for magnetic audio recording. The audio information 49 is recorded in a predetermined pattern as indicated by the broken lines 49 in a manner that will be described hereinafter. The program information 51 is in the form of conductive ink patterns printed over the magnetic oxide particle coating. Two such conductive ink patterns are depicted although eight such patterns are printed on the medium when it is adapted for use with the teaching machine 10 of FIG. 1. Each conductive pattern consists of a common segment 55 and a program segment 57. The common segment 55 is continuous and is terminated at the edge 59 of the medium 15 while the program segment 57 is discontinuous thereby presenting alternate conductive and non-conductive segments. When the medium 15 is inserted into the teaching machine 10 of FIG. 1, the teaching machine makes an electrical connection with the terminal portion of each common segment 55. Additionally, a contact is made with each program segment 57. Whether electrical contact is made with the program segment 57 by the teaching machine depends upon whether physical contact is made with a conductive portion of the program segment 57 or with a non-conductive portion of the program segment 57.

Referring now to FIG. 3, a perspective view partially in section of the teaching machine 10 of FIG. 1 is depicted. The transparent shield 13 and the medium 15 depicted in FIG. 1 is not shown in FIG. 3 for purposes of clarity. The medium (not shown) is manually inserted over flanges 19 and 20 and pushed along over the parallel guide rails 71 and 72 until its leading edge reaches surface 73. The medium is thereafter in place for coaction with the magnetic recording and playback head of the teaching machine 10 and with the programming means as will be hereinafter described. When it is desirous to eject the medium from the machine, the card eject keybutton 37 is depressed. This effects the rotation of bell crank 75 about pivot 77 in a clockwise direction as viewed. This motion is transmitted through link 79 and link 81 to a spring biased latch mechanism (not shown). Upon movement of the bell crank, the latch mechanism is released thereby causing ejector 83 to move toward the flanges 19 and 20. The edge of the medium (not shown) abutting surface 73 is pushed by the ejector 83 so that it partially protrudes from the teaching machine 10. Thereafter, the medium can be manually removed. The ejector 83 and its associated latch mechanism (not shown) is reset upon insertion of the medium into the machine.

Once the medium has been inserted into the machine, the magnetic head 85 can be moved relative to the medium to playback previously recorded audio information or to record oral responses made by the student. Referring briefly to FIG. 2, audio information 49 is represented on the medium 15 as a series of broken parallel lines alternately connected to one another at opposite ends of the lines. This pattern represents the motion of the magnetic head 85 of FIG. 3 as it moves relative to medium 15 during audio recording and playback.

Referring once again to FIG. 3, the mechanism which effects the relative motion between the magnetic head 85 and the medium in the pattern discussed above will be described. A detailed description of a similar mechanism is disclosed and described in the afore-referenced copending application of William L. Dollenmayer, entitled, "Transducer Driving Arrangement for Recording and Reproducing Apparatus."

The magnetic head 85 is mounted to allow motion in a vertical plane to four-bar linkage 87 and 88 which in turn is mounted to head carrier 89. A spring (not shown) biases the magnetic head 85 upward so that it intimately contacts the underside of the medium (not shown) when the media is inserted into the teaching machine 10. The head carrier 89 is mounted for reciprocal motion on a carrier guide rod 91 and on a slot (not shown) in the carrier guide rail 93. A lead screw follower 95 is pivotly mounted to the head carrier 89 and follows the lead screw 97 as the lead screw rotates. The lead screw is roated in a single direction by motor 98 and has two sets of grooves 99 and 100 cut therein to allow for reciprocal motion of the head carrier 89. As the lead screw 97 rotates, it acts on the lead screw follower 95 to cause the head carrier 89 to move in accordance with the groove 99 or 100 that the lead screw follower 95 rests in. When the lead screw follower 95 reaches the extreme limit of its motion on the lead screw, it transfers from one groove to the other groove thereby effecting reciprocal motion. Additionally, as the head uarrier 89 approaches either extreme of its motion, it activates an escapement mechanism which effects motion of the head carrier 89 in a direction perpendicular to the motion effected by the lead screw and lead screw follower action.

This perpendicular motion is effected when the actuator 101 which is fixedly mounted to the head carrier 89 pushes against either stop screw 102(a) or stop screw 102(b). The stop screws 102(a) and 102(b) are mounted to slider 103. Slider 103 has guide slots 104 and 105 cut therein through which screws 106 and 107 are fixedly mounted to the carrier guide rail 93. Thus, slider 103 assumes one of two states, e.g., it is either pushed to the left or to the right. Push rod 109 is fixedly secured to the slider 103 and follows its action. The opposite end of push rod 109 is connected to the escapement pawls shown in FIGS. 4 and 5 and to a carrier position switch (not shown) which closes whenever the carrier and head reach the extreme of their motion adjacent to the numbered keybuttons 27.

Referring now to FIG. 4, the escapement pawls and the escapement mechanism is depicted. As described above, push rod 109 reciprocates in the direction of arrows 111 and 112. This motion causes the pawls 113 and 115 to engage and disengage the escapement rack 117. As depicted in FIG. 4, push rod 109 has been moved to its extreme position in the direction of arrow 111. When it is thereafter moved in the direction of arrow 112, it pushes on lever 119 which pivots about pivot 121. The pivoting action of lever 119 causes tab 123 which forms an intricate part of the lever to move away from the pawl 113. Pawl 113 is spring biased so that it moves into the escapement rack 117. Rod 109 extends in a downward direction as viewed in FIG. 4 and comes into engagement with the rear portion 124 of pawl 115. Pawls 115 and 113 are both pivotally mounted about pivot 125 and thus, the continuous motion of push rod 109 in the direction of arrow 112 causes pawl 115 to pivot about its pivot 125 and disengage the escapement rack 117 after pawl 113 has engaged the escapement rack. When the push rod moves in the direction of arrow 111, lever 119 rotates in a clockwise direction about pivot 121. Tab 123 then engages pawl 113 and causes it to disengage rack 117 and push rod 109 is removed from the rear portion 124 of pawl 115 thereby causing the spring biased pawl 115 to engage the escapement rack 117. As can be seen, either pawl 113 or pawl 115 is always in engagement with the escapement rack 117.

When it is desirous to remove both escapement pawls from the rack, lever 127 is rotated in a counter clockwise direction about pivot 125 by the action of a torque bar 129 which moves in the direction of arrow 111. The torque bar 129 engages tab 131 of the lever 127 thereby effecting its counter clockwise motion about the pivot 125. Tab 133 of the lever 127 engages both pawl 113 and pawl 115 pulling both of the pawls against their spring bias out of contact with the escapement rack 117.

Referring once again to FIG. 3 of the drawings, the reciprocating motion of the magnetic head 85 has been described. Additionally, it has been described how the push rod 109 reciprocates back and forth when the magnetic head 85 and the head carrier 89 reach the extreme of their motion. The reciprocating motion of the push rod 109 effects the engagement of one of two pawls (not shown) into an escapement rack (not shown) and the disengagement of the other pawl as discussed with respect to FIG. 4. The pawls as well as the magnetic head 85 and the head carrier 89 are fixedly mounted to a carriage 139. The carriage 139 is mounted on fixed rod 141 and on the fixed rail 143 for motion in the direction of arrows 145 and 147. A carriage follower 149 supports the carriage 139 on the fixed rod 141 and a roller (not shown) fits into slot 151 of the fixed rail 143 to support the carriage 139. A spring motor 153 tends to wind cable 155 in the direction of arrow 145. The cable 155 is connected to the carriage 139. The carriage is normally restrained from moving in the direction of arrow 145 by the engagement of one of the two pawls (not shown) in the escapement rack (not shown) discussed heretofore with respect to FIG. 4.

Referring briefly once again to FIG. 4, the teeth of pawl 113 and pawl 115 are displaced by the distance between adjacent audio tracks while the teeth of escapement rack 117 are displaced by twice this distance. Referring again to FIG. 3, when the pawls of FIG. 4 are caused to alternately engage and disengage the escapement rack, the spring motor 153 effects movement of the carriage 139 in the direction of arrow 145 by distance corresponding to the distance between adjacent audio tracks.

Summarizing, the magnetic head 85 and the head carrier 89 reciprocate back and forth along the carrier guide rod 91 and carrier guide rail 93 when the lead screw 97 is rotated. When the head carrier 89 reaches an extreme of its motion, it effects movement of push rod 109. Push rod 109 operates on two escapement pawls (shown in FIG. 4) to disengage one pawl from and to engage the other pawl with an escapement rack. Spring motor 153 provides a force in the direction of arrow 145 on the carriage 139 on which the head carrier and escapement pawls are mounted. Thus, when the escapement pawls alternately engage and disengage, motion is imparted to the carriage 139 in the direction of arrow 145. The motion effected corresponds to the distance between audio tracks.

When it is desirous to move the carriage 139 rapidly in the direction of arrow 145, it is necessary to disengage both of the pawls (not shown) from the escapement rack (not shown) as discussed with respect to FIG. 4. The spring motor 153 then effects rapid motion of the carriage until the pawls are re-engaged. Motor 157 which is mounted on the carriage 139 is utilized to effect motion of the carriage in the direction of arrow 147. When the motor 157 is turned on, drive roller 159 rotates in a clockwise direction as viewed. The rotation of the drive roller 159 in a clockwise direction overcomes the force of the spring motor 153 on the carriage 139 and effects motion of the carriage in the direction of arrow 147.

The foregoing description has related in part to the mechanisms which cause the magnetic head 85 to move with respect to the medium (not shown) in a fixed pattern (shown on the medium 15 of FIG. 2 by the broken lines representing the audio information 49). This fixed pattern motion is effected whenever the student is listening to pre-recorded audio information or is recording audio information onto the medium. Additionally, the mechanism for effecting rapid motion of the carriage 139 and hence the magnetic head 85 attached thereto in the directions of arrows 145 and 147 has been described. In the discussion which follows, the mechanism and circuits which initiate and stop the rapid motion of the carriage to thereby effect fixed and variable indexing of the magnetic head 85 with respect to the medium will be described.

As has been previously described, the carriage 139 can be indexed to a position determined by the student or to a position determined by the programmer in accordance with a student response. The numbered keybuttons 27 are utilized by the student to index the carriage to a fixed position adjacent to the depressed numbered keybutton. Indicator 41 which is fixedly secured to the carriage 139 at a point in line with the magnetic head 85 moves to a position adjacent to the midpoint of the depressed numbered keybutton 27 when a fixed index is effected. Indexing to a point determined by the programmer is accomplished whenever the student depresses the lettered keybuttons 25 or the repeat key 29. Sensing brushes 161 and 163 are mounted to the carriage 139 in line with the magnetic head 85 and make contact with the program information on the medium (not shown). Additionally, sensing brushes 165 which are fixedly secured to the outer housing 11 of the teaching machine 10 also make contact with the program information on the medium. The program information sensed by the sensing brushes 161 and 163 as the carriage 139 moves with respect to the medium is utilized to control the movement of the carriage 139 after a lettered keybutton 25 is depressed as will be described hereinafter.

Referring now to FIG. 5, a numbered keybutton 27 and its associated mechanism which effect fixed indexing of the recording head is depicted. It should be noted that the mechanical operation of the numbered keybuttons and the lettered keybuttons is the same. Depression of the numbered keybutton 27 causes the keybutton and its associated key stem 167 to pivot in a clockwise direction as viewed about pivot 169. As the key stem 167 pivots, the camming surface 171 of the key stem forces the latching bar 173 to pivot in a clockwise direction about pivot 175 and against the spring bias of spring 177. Continued motion of the key stem allows the latching bar 173 to pivot in a counterclockwise direction and come to rest on the camming surface 179. The key stem remains in this position until another keybutton is depressed. The depression of another keybutton operates in a similar manner upon the latching bar 173 causing it to rotate firstly in a clockwise direction and then in a counterclockwise direction about pivot 175 as viewed. When the latching bar rotates in a clockwise direction, it releases the key stem 167 of the keybutton which has previously been actuated and which is returned to its initial position under the bias of spring 181. Depression of the keybutton 27 also effects closure of contacts 27' which remain closed until the keybutton is restored to its initial position. Closure of the contacts 27' effects motion of the carriage 139 of FIG. 3 and the carriage follower 149 along fixed rod 141 in a manner to be described. Brush block 185 is fixedly secured to the carriage follower 149 and has four brushes 187 secured thereto. The brushes make contact with printed circuits 189 which are secured to the outer housing 11. The electrical signals derived from the brushes 187 are utilized to precisely position the carriage follower 149 and hence the magnetic recording head (not shown) as will be described.

Referring once again to FIG. 3 of the drawings, an electrical circuit board 191 having various electrical components 192 mounted thereto is depicted. The electrical components are responsive to the actuation of the numbered keybuttons 27, the lettered keybuttons 25, the program information contained on the medium (not shown) as sensed by sensing brushes 161, 163, and 165, and the actuation of the repeat keybutton 29, the listen keybutton 31, the stop keybutton 33, and the talk keybutton 35 to actuate motor 157 or to enable spring motor 153 in order to position the magnetic head 85 at a desired location. These components and the circuits which they form will be discussed with reference to FIGS. 6a and 6b of the drawings. Additionally, the components are responsive to the electrical signals generated by the magnetic head 85 to amplify them and to convey them to the speaker 193. The components are further responsive to the transducer located in the microphone 43 (of FIG. 1) and to the talk keybutton 35 to effect the recording of audio signals onto the medium. These latter components and the circuits which they form are of the type well known in the art and will not be described in detail.

As has been heretofore described, relative motion between the recording and reproducing head and the medium is effected under the control of two driving motors, the spring motor 153 of FIG. 3 and the electrical motor 157 of FIG. 3. The spring motor is operative to move the recording head in the direction of arrow 145 whenever both escapement pawls are removed from the escapement rack as explained with respect to FIG. 4 and the electrical motor is operative to move the recording head in the direction of arrow 147 when it is energized. Referring now to FIG. 6a, the pawl magnet 211 is operative to effect the disengagement of the escapement pawls from the escapement rack thereby causing the spring motor to move the magnetic head with respect to the media. When the pawl magnet is de-energized, the pawls are returned under their spring bias to engage the escapement rack thereby stopping the relative motion between the recording head and the medium. The carriage motor 157 utilized to effect motion between the recording head and the medium in a direction opposite that effected by the spring motor is depicted in FIG. 6a schematically. As has also been described, the carrier motor 98 which is schematically depicted causes the recording head to reciprocate back and forth across the medium.

In the description which follows, the circuits which control the movement of the carriage and recording head during normal recording and playback operations as controlled by the keybuttons 29 to 35 of FIG. 3 will be described. Referring briefly to FIG. 3, when the medium (not shown) is inserted into the machine, sensing brushes 161 and 163 rest upon program information on the medium. Referring to FIG. 2, the program information 51 consists of program segments 57 on which the brushes rest. The program segments are alternately conductive and non-conductive. When a brush rests upon a conductive segment a circuit is made from the brush, through the conductive portion of the program segment 57, through the common segment 55 to the brushes 165 of FIG. 3.

Referring once again to FIG. 6a, the brushes 161 and 163 of FIG. 3 are depicted at 161(A) to 161(D) and 163(A) to 163(D) while the program segments 57 of FIG. 2 are depicted by blocks 201 to 208. If the portion of the program segment with which the brush makes contact is conductive, a circuit path is made from the ground terminal 212 through the brush and through the block 201 to 208 on which the brush is resting to a switch or contact converter circuit. If, on the other hand, the portion of the program segment is non-conductive, no current path is made through the brush.

Two separate enabling current paths are provided in order to effect the playback of audio information. One such path is from the ground terminal through brush 161(A) and block 201 to the contact converter 213 and the other is from the ground terminal 212 through the listen keybutton contact 31'. The output side of the contact converter 213 is connected through normally closed relay points 215, 216, and 217 to the normally closed stop switch contact 218 associated with the stop keybutton 33 of FIGS. 1 and 3. The stop switch contact 218 is in turn connected to one side of the run magnet 219. The other side of the run magnet 219 is connected to the normally transferred eject switch 221 of FIG. 6b which is connected to the —12 volt terminal 222. When the run magnet 219 is picked, relay points 223 and 224 are transferred thereby turning on the carrier drive motor 98 and the amplifier 227. The carrier drive motor effects reciprocal motion of the magnetic recording head back and forth across the medium and the amplifier 227 is responsive to the electrical signals transduced from the medium by the recording head to effect amplification of the signals so that they may be utilized by a loud speaker.

As heretofore described, a carrier positioning switch 229 is associated with the carrier which is transferred whenever the carrier reaches the extreme of its motion in the direction adjacent to the keybuttons. The switch is transferred once the carrier motor 98 effects motion of the carrier away from its extreme position thereby providing a holding path from the ground terminal 212 through the switch 229 to the run magnet 219. Thus, if the listen button 31 were released or if brush 161(A) no longer makes contact with the conductive portion of block 201, the run magnet 219 continues to be energized until the carrier returns to its extreme position adjacent to keybuttons at which time the run magnet is de-energized. The switch 229 and its associated holding path to the run magnet 219 insures that the recording head is always returned to a fixed location.

The foregoing description has described the control of the playback of sounds previously recorded on the medium whenever the listen keybutton 31 is depressed or whenever the run program segment 201 is conductive. In the description which follows, it will be described how a student's oral responses can be recorded on the medium. When the student depresses the talk keybutton thereby closing switch 35', a current path is made between the ground terminal 212 and the contact converter 231 if the sensing brush 161(B) is adjacent to a conductive portion of block 202. If the sensing brush 161(B) is adjacent to a nonconductive portion of block 202, no current path will be made to the contact converter 231 and the recording of oral responses onto the medium will be inhibited. Assuming that the brush 161(B) is adjacent to a conductive portion, ground voltage is applied through diode 233 to contact converter 213 which effects the enerization of the run magnet 219 in a manner similar to that heretofore described. Additionally, ground voltage is supplied to the input of the contact converter 231 which picks the record magnet 235. The picking of the record magnet 235 converts the amplifier 227 so that it effects amplification of the student's oral response which is presented to the transducer (not shown) in the microphone 43 of FIG. 1. The student can continue to record information onto the medium until either block 202 becomes non-conductive as sensed by the sensing brush 161(B) or until the student releases the talk button 35. It can thus be appreciated that the only areas on the medium adjacent to conductive portions of block 202 can be recorded on by the student.

As has been heretofore described, it is often desirous to have the student repeat information which has previously been presented. Two methods have been described for repeating such information: to have the student effect a fixed branch to previously listened to information or to have the student effect a branch to previously listened to information as determined by the programmer. That is, the programmer determines how much information the student should have repeated to him if the student depresses a repeat keybutton. In order to accomplish the programmed repeat of information, the repeat keybutton contact 29' is closed. If the sensing brush 161(C) is resting on a conductive portion of block 203, ground terminal 212 is connected through the contact converter 237 and through the then closed repeat key 29 to pick the repeat magnet 239. The repeat magnet is held picked through its own holding contact 241 and remains picked until block 203 becomes non-conductive as sensed by sensing brush 161(C).

Picking of the repeat magnet 239 opens relay point 215 thereby assuring that the run magnet 219 is deenergized when carrier position switch 229 transfers (assuming the device was in run mode). This insures that the amplifier 227 is turned off. Additionally, the picking of the repeat magnet 239 transfers relay point 243 which couples —12 volts to the carriage drive motor 157. The opposite side of the carriage drive motor 157 is connected to the carrier position switch 229 which is in turn connected to the ground terminal 212. The carrier position switch 229 provides a ground path once the carrier has returned to its extreme position. Until that time, it prevents the run magnet 219 from dropping out. This insures that the carrier has returned to its extreme position before motion in the reverse direction as supplied by the carriage motor 157 is effected. Motion in the reverse direction continues until sensing brush 161(C) no longer senses a conductive segment of block 203. Thereafter, motion in the forward direction is controlled by the utilization of the listen key 31, the talk key 35, and/or the sensing of a conductive segment by the sensing brush 161(A) on block 201 as heretofore described.

It is often desirous to effect indexing of the recording head with respect to the media to a position determined by the programmer in accordance with a student response to a question. In the description which follows, the circuits which control the movement of the carriage and recording head during a programmed indexing operation will be described. Generally, the student is presented a multiple choice question and asked to respond by selecting one of the lettered keybuttons 25 of FIG. 3. Depression of a lettered keybuttton closes a corresponding switch 25(A), 25(B), 25(C), or 25(D). Upon depressing one of the lettered keybuttons, contact is made through the corresponding sensing brush 163(A) to 163(D), through the corresponding block 205–208, the activated switch 25A to 25D, to the contact converter 245. The output of the contact converter 245 is connected to the latch bar contact 247 which is momentarily made whenever any one of the lettered keybuttons 25 is depressed. The output of the contact converter 245 is thus transferred through the latch bar contact 247 to pick the variable index magnet 249.

When the variable index magnet 249 is energized, its own relay point 251 is transferred providing a parallel path to the latch bar contact switch 247 which is a momentary make type of switch. Further, relay point 216 is opened effecting the de-energization of the run magnet 219 once the carrier position switch 229 is transferred indicating that the carrier has reached an extreme of its motion. Relay point 253 is also closed thereby energizing the pawl magnet 211. The opposite side of the pawl magnet 211 is connected to ground through the carrier position switch 229. Energization of the pawl magnet removes the pawls from the escapement rack as described with respect to FIG. 4 thereby causing the spring motor of FIG. 3 to effect motion of the magnetic head in a forward direction with respect to the media. This motion continues until the pawl magnet 211 is de-energized. The pawl magnet 211 is de-energized when the sensing brush 163 no longer makes contact with a conductive portion of its associated block 205–208. At this time the path from the ground terminal 212 to the variable index magnet is broken and the magnet is de-energized thus de-energizing the pawl magnet 211 and opening relay points 251. Since the switches 25A–25D remain closed until another lettered keybutton is depressed, the latch bar contact switch 247 insures that the variable index magnet 249 is not picked unless the student pushes down on another one of the lettered keybuttons. Otherwise, it would be possible to pick the variable index magnet 249 through the latched down lettered keybutton whenever a conductive program segment were sensed by the corresponding sensing brush 163.

Referring once again to FIG. 3, in the operation described above the student was presented with a multiple choice question and the teaching machine stopped in accordance with information sensed by the brushes 161 awaiting a response. By depressing a lettered keybutton 25, the magnetic head 85 moved in the direction of arrow 145 as long as the brush 163 corresponding to the depressed keybutton 25 sensed a conductive segment on the medium (not shown). Thereafter, motion is halted and the student either depresses the listen keybutton to hear an audio reinforcement or the teaching machine 10 will automatically start playing back an audio reinforcement in accordance with information sensed by brushes 161.

Referring once again to FIG. 6a, it is often desirous to keep track of incorrect student responses. Such incorrect responses can be digitally encoded on the medium as will be later described with respect to another embodiment of the teaching machine of the present invention or a simple counter can be provided to count the number of times that student error is made. Those areas of the programmed medium containing reinforcement for incorrect answers can be coded so that a special error program segment is conductive adjacent to the incorrect answer reinforcement areas. Thus, whenever a student makes a wrong answer by depressing a lettered keybutton 25A to 25D thereby effecting an index to an incorrect answer reinforcement area, sensing brush 161(D) senses conductive material on block 204 thereby providing a path from ground terminal 212 to magnet 257 through contact converter 259. The magnet 257 is picked when the run magnet 219 is thereafter picked thereby closing relay points 260. The magnet 257 can be utilized to control a counter which thus counts the number of times an incorrect response has been made.

Referring once again to FIG. 3 of the drawings, the operation of the lettered keybuttons 25 which effect indexing of the audio playback and recording head to a position selected by the programmer in accordance with the depressed lettered keybutton has been described. Additionally, the operation of the repeat keybutton 29, the listen keybutton 31, the stop keybutton 33, and the talk keybutton 35 have been described. In the description which follows, the operation of the numbered keybuttons 27 which effect fixed indexing of the audio recording and reproduction head to a position adjacent the depressed numbered keybutton will be described. Referring briefly to FIG. 5 of the drawings, it will be recalled that four brushes 187 are mounted to the carriage follower 149 which in turn is mounted to the carriage. These brushes sense conductive patterns on printed circuits 189 thereby indicating the position of the carriage with respect to the medium (not shown).

Referring now to FIG. 6b of the drawings, the printed circuits are depicted at 189(A) to 189(D) and the brushes are depicted at 187. The printed circuit 189(A) comprises a series of segments labeled "1" to "10" which is utilized to control the movement of the recording head carriage (not shown) and hence the brushes 187 mounted thereto with respect to the medium (not shown) when it moves in the reverse direction under control of the carriage drive motor 157 of FIG. 6A. The printed circuit 189B is a continuous common segment also adapted to control motion in the reverse direction. A pair of the brushes 187 connect the printed circuits 189(A) and 189(B) electrically. In a similar manner, the continuous printed circuit 189(C) and the discontinuous printed circuit 189(D) which has a series of segments labeled "1" to "10," control the movement of the carriage and hence the brushes 187 when it is moving in the forward direction under the control of the spring motor (not shown). The numbered switches 27' correspond to the numbered keybuttons 27 discussed with respect to FIG. 5 of the drawings. It will be recalled that one such numbered switch is always latched down thereby closing its associated switch 27'. Upon the depression of another numbered keybutton, the latched down keybutton is released thereby breaking the electrical contact made by its associated contacts 27' prior to the time that the newly depressed keybutton causes its associated contacts 27' to make electrical contact.

Each of the numbered contacts 27' is connected on one side to the −12 volt terminal 222 and on its other side through a diode matrix to the printed circuits 189(A) and 189(D). Since the connection for each of the numbered contacts 27' is similar, the following will describe the connection of the numbered contacts 27' labeled "5." These contacts are connected through diode 261 to the reverse segment 189(A) labeled "5." The contacts are also connected through diode 263 to the forward segment 189(D) labeled "5." When the contacts 27' labeled "5" are closed, −12 volts appears on the left hand side of diode 263. This voltage is passed through diode 265, 266, and 267 to the forward printed circuit segments 189(D)

labeled "1" to "4." Diodes 269 to 273 prevent the −12 volts from being applied to the forward segments 189(D) labeled "6" to "10." In a similar manner, diodes 275–279 allow the −12 volts appearing on the left hand side of diode 261 to be applied to the reverse segments 189(A) labeled "6" to "10" while diodes 281 to 284 prevent the −12 volts from being applied to the reverse printed circuit segments 189(A) labeled "1" to "4."

Summarizing, when the numbered keybutton 27 labeled "5" is depressed, both the reverse and forward printed circuits 189(A) and 189(D) labeled "5" are energized. Additionally, the forward printed circuit segments 189 (D) labeled "1" to "4" and the reverse printed circuits segments 189(A) labeled "6" to "10" are energized. All of the numbered contacts 27' operate in a similar manner and it can thus readily be seen that the printed circuit segments corresponding to the keybutton depressed and all preceeding forward segments and all succeeding reverse segments are energized with −12 volts.

In the description which follows, it will be assumed that the numbered keybutton 27 labeled "5" is to be depressed and that the numbered keybutton 27 labeled "2" has previously been depressed and is mechanically locked down. Further, it will be assumed that the brushes 187 are resting, as depicted, on the printed circuits 189(A) to 189(D). Since the numbered keybuton 27 labeled "2" is depressed, a circuit is made through the contacts 27' labeled "5," through diode 287 to the node 288 and then through relay points 291 of FIG. 6a to the reverse magnet 292 of FIG. 6a. The relay points 291 are controlled by the reverse magnet 292 and hence, the reverse magnet is held on through these normally opened relay points. Thus, when the device is in its initial position awaiting student depression of a keybutton, the reverse relay 292 is picked and is held on through the latched down contact points 27' of a previously selected numbered switch.

When the student depresses the numbered keybutton 27 labeled "5," the contacts 27' labeled "2" break contact before the contacts 27' labeled "5" make contact thereby causing the reverse magnet 292 of FIG. 6a to drop. A current path than exists between the −12 volt terminal 222 and the start magnet 295 of FIG. 6a through the normally closed relay points 297 of FIG. 6a which are controlled by the reverse magnet 292 of FIG. 6a.

Referring to FIG. 6a, if the machine were in a run condition as has been previously described, it is necessary that the head carrier reach an extreme of its motion prior to indexing. Hence, when the start magnet 295 is picked, relay points 217 controlled by the start magnet are opened thereby opening a current path to the run magnet 219. When the head carrier reaches an extreme of its motion, carrier position switch 229 is transferred thereby de-energizing the run magnet 219. Additionally, when the carrier position switch 229 transfers, the ground potential of ground terminal 212 is applied to the left hand side of the pawl magnet 211 and the carriage motor 157.

Referring again to FIG. 6b, when the contacts 27' labeled "5" are closed, the −12 volts of −12 volt supply 222 is supplied through the closed switch and diodes 263, 265, 266, and 267 to node 288 and then to the forward printed circuit segment 189(D) labeled "2." This voltage is then transferred by the brush 187 to the forward printed circuit common segment 189(C). It should be noted that the brush 187 has a larger contact area than the area between the segments of the printed circuits 189(D) and 189(A) so that it is always in contact with a segment of the printed circuits. The negative voltage supplied to the printed circuit 189(C) is passed through the normally closed relay points 299 of the then de-energized reverse magnet 292 of FIG. 6a to node 300. Thereafter, this negative voltage is supplied, as will be described, to effect movement of the carriage in the forward direction. Referring now to FIG. 6a, the negative voltage at node 300 in FIG. 6b is applied to the contact converter 303 and then to the diode 305 to thereby energize the pawl magnet 211. The output of the contact converter 303 is also applied through diode 307 and resistor 308 to the carriage motor 157. The energization of the pawl magnet 211 enables the spring motor 153 (of FIG. 3) to effect motion of the carriage in a forward direction. A reduced amount of current is supplied to the carriage motor 157 through resistor 308 and causes the motor to act as a kinetic break to the spring motor (not shown) in this mode of operation.

As the carriage thus moves in the forward direction, the brushes 187 of FIG. 6b consecutively sweep the segments of the printed circuit 189(D) labeled "2" through "5." Since a negative potential is supplied through each of these segments through the diodes 263 and 265–267, motion of the head carriage in the forward direction continues. When the brushes 187 reach the printed circuit 189(A) segment labeled "5," voltage is applied through the diode 261 to the segment and then through the brushes 187 to the printed circuit 189(B). This voltage passes through the relay points 311 of the then energized start magnet 295 of FIG. 6a to node 313. The voltage appearing at node 313 is applied through diode 315 to node 300. This negative voltage at node 300 continues to keep the pawl magnet 211 of FIG. 6a energized. The voltage appearing in node 313, as will be described, is utilized to effect a breaking action on the carriage and the precise positioning of it.

Referring once again to FIG. 6a of the drawings, the voltage appearing at node 313 of FIG. 6b is applied to the contact converter 317 and is thereafter applied to diodes 319, 320, and 321. The voltage appearing at the output of diode 321 assures that the start magnet remains picked. The voltage appearing in the output of diode 320 picks the reverse magnet 292 which thereafter continues to be held on through its own relay points 291. The voltage appearing at the output of diode of 319 drives the carriage motor 157 so that the carriage is driven in the reverse direction thereby overcoming the force supplied by the spring motor 153 of FIG. 3.

Referring once again to FIG. 6b of the drawings, when the reverse magnet 292 FIG. 6a is picked, relay point 299 is opened thereby inhibiting further transfer of negative voltage from the printed circuit 189(D) through the brushes 187 and the printed circuit 189(C) to the node 300. As the carriage starts its motion in the reverse direction, the brushes 187 are driven out of contact with the printed circuit 189(A) labeled "5" thereby removing the negative potential from node 313. Thus, the negative voltage potential is removed from both nodes 300 and 313. When this occurs, negative voltage is removed from the contact converters 303 and 317 of FIG. 6a thereby removing negative voltage from the pawl magnet 211, the carriage motor 157, and the start magnet 295 of FIG. 6a. With current removed from the pawl magnet, the pawls 113 and 115 of FIG. 4 drop into the escapement rack 117 and further motion of the carriage in the forward direction is inhibited. With current removed from the carriage motor 157, further motion of the carriage in the reverse direction is inhibited.

In the description above, the closing of the numbered contacts 27' effected motion of the carriage in the forward direction. However, if the carriage is initially positioned adjacent to a numbered keybutton 27 having a number higher than the number of the numbered contacts 27' to be closed, motion in the reverse direction is effected. Hence if the brushes 187 which are indicative of the carriage position are resting upon the printed circut 189(A) segment labeled "8," closure of the numbered contacts 27' labeled "5" effects moton in the reverse direction. Upon contact closure, the reverse magnet 292 drops and the start magnet 295 is picked in the same manner described above. A circuit is then made from the segment of the printed circuit 189(A) labeled "8" through the brushes 187 to the printed circuit 189(B) and then through the relay point 311 controlled by the then energized start magnet 295 of FIG. 6a to node 313. The negative voltage at the node 313 is supplied through diode 315 to the node 300. As has been heretofore described, voltage applied to these nodes effects the picking of the pawl magnet 211 of FIG. 6a and the application of the voltage to the carriage motor 157 of FIG. 6a thereby effecting carriage motion in the reverse direction. The carriage motion in the reverse direction continues until the brushes 187 pass the segment of printed circuit 189(A) labeled "5" as they move in the reverse direction. At this time, the negative voltage at nodes 313 and 300 is disconnected as heretofore described and the escapement pawls 113 and 115 engage the escapement rack 117 of FIG. 4 as also heretofore described.

Summarizing, closure of any one of the numbered contacts 27' effects motion of the carriage (not shown) so that the brushes 187 move over the printed circuits 189 in the direction toward the segments of the printed circuits 189(A) and 189(D) corresponding to the closed numbered contacts 27'. Regardless of the direction of travel which the carriage 187 takes, the last motion effected is always in the reverse direction and ceases immediately when the brushes 187 no longer contact the segment of the printed circuit 189(A) associated with the closed numbered contacts 27'.

Referring once again to FIG. 1 of the drawings, the operation of the teaching machine 10 has been described. It has been seen how the student can effect fixed indexing of the audio playback and recording head as indicated by indicator 41 by depressing the numbered keybuttons 27. Thus, if the student desired to hear the audio information corresponding to the visual indicia 39 and 23(b), he would depress the numbered keybutton 27 labeled "6" and the recording and reproduction head as indicated by indicator 41 would be positioned adjacent the indicia 23(b). In this position, the student could thereafter depress the listen keybutton and hear the information previously recorded or he could depress the talk keybutton 35 and record information onto the medium provided that the recording head was at an area of the medium where an oral response could be made.

It has also been described how the student can depress the lettered keybuttons 25, usually as a response to a question presented and effect indexing of the audio recording and playback head as indicated by the indicator 41 to a position determined by the programmer in accordance with the student response. Thereafter, the student would hear an audio reinforcement corresponding to the selected lettered keybutton. The reinforcement could contain learning material as well as an instruction to depress a particular numbered keybutton 27. Additionally, it has been described how the depression of the repeat keybutton 29 effects motion of the recording head as indicated by indicator 41 in a backward direction over information previously heard by the student and/or recorded by him to a location determined by the programmer.

Referring now to FIG. 2 of the drawings, the medium utilized in the teaching machine 10 of FIG. 1 is depicted. The medium is in the form of a unit record corresponding in size to an IBM punch card. As has been described, this medium contains both the visual, audio, and programming information thereon. As is appreciated by those skilled in the art, the utilization of a unit record of material has an inherent advantage over continuous tapes and other such media in that the information content of a pack of such unit records and the sequence in which the records are presented may be readily varied by merely rearranging, inserting, and deleting the unit records. The medium depicted has a further advantage in that the visual indicia and the programming information may be easily printed thereon thereby effecting mass production. However, if it is desirous to convey more visual indicia to the student, the modification to both the medium and the teaching machine as depicted in FIG. 7 may be made.

Referring now to FIG. 7 of the drawings, a teaching machine 350 adapted to receive medium 351 is depicted. The teaching machine 350 has associated therewith a plurality of numbered keybuttons 353 and a plurality of lettered keybuttons 355. The lettered keybuttons function in the exact manner as the lettered keybutons 25 of teaching machine 10 in FIG. 1. That is, they co-act with the program information 357 located on the medium 351 to effect movement of the audio recording and playback head (not shown) with respect to the medium. The numbered keybuttons 353 effect fixed indexing of the audio recording and playback head with respect to the medium in a manner similar to that described with respect to the numbered keybuttons 27 of the teaching machine 10 of FIG. 1. Also, the listen keybutton 359, the talk keybutton 360, the stop keybutton 361, and the repeat keybutton 362 function in a manner similar to that described with respect to their corresponding keybuttons of the teaching machine 10 of FIG. 1.

The teaching machine 350 also has associated therewith a "next" keybutton 364. Depression of this keybutton effects a fixed increment of motion of the medium 351 with respect to the teaching machine 350. Such medium motion is effected by a sprocket wheel 365 and a second sprocket wheel (not shown) which co-act with the series of perforations 366 located in the medium 351. The sprocket wheel 365 is rotated by motor 367 through a fixed angle under control of the clutch 368 upon depression of the next keybutton 364 which also causes the audio recording and reproduction head (not shown) to assume a home or initial position.

The visual information associated with the medium 351 is located on a series of film frames 369 which are attached to the medium 351. As the medium indexes through the teaching machine 350 under the control of the next keybutton 364, it stops so that a film frame 369 is adjacent a projection station (not shown). The projection station consists of a light source and lenses (not shown) appropriate for projecting the image of the adjacent film frame 369 onto the frosted glass screen 371. The audio information corresponding to each film frame 369 is located adjacent to the film frame on the underside of the medium 351 is indicated by the broken lines 373. A motion amplifier attached to the recording and reproducing head carriage (not shown) controls the relative position of the indicator 375 with respect to teaching machine 350 as the recording head moves with respect to the medium 351.

In operation, the medium 351 is inserted into the teaching machine 350 so that a film frame 369 is adjacent the projection system (not shown) and the visual information located on the film frame 369 is projected onto the screen 371. The audio recording and reproduction head (not shown) is returned to an initial position thereby causing the indicator 375 to assume a position adjacent the numbered keybutton 353 labeled "1." Thereafter, the student depresses the listen keybutton 359 or the talk keybutton 360 as described heretofore with respect to the teaching machine 10 of FIG. 1. Depression of either such keybutton causes the audio recording and reproducing head to sweep out a pattern over the medium 351 as indicated by the broken lines 373. The mechanisms and circuitry utilized to accomplish this is similar to those described with respect to FIGS. 3 to 6.

Fixed indexing of the audio recording and reproducing head (not shown) with respect to the medium 351 is effected when the student depresses a numbered keybutton 353 is a manner similar to that described with respect to the teaching machine 10 of FIG. 1. Since the audio information associated with each film frame 369 is of shorter duration than the audio information 49 associated with the medium 15 of FIG. 2, the teaching machine 350 has a smaller number of numbered keybuttons 353 than does the teaching machine 10 of FIG. 1. Additionally, the printed circuit (not shown) of the teaching machine 350 does not align itself with the numbered keybuttons 353 as does the printed circuit 189 of the teaching machine 10 of FIGS. 3–6. Other than these differences, however, the operation of the numbered keybuttons 353 of the teaching machine 350 is identical to that described with respect to the numbered keybuttons 27 of the teaching machine 10 of FIGS. 1–6.

Programmed indexing of the audio recording and reproducing head (not shown) with respect to medium 351 is effected when the student depresses one of the lettered keybuttons 355. Depression of the lettered keybutton effects indexing of the audio recording reproducing head to a position determined by the program information 357 located on the medium in the same manner as discussed heretofore with respect to the teaching machine 10 of FIGS. 1 to 6. It should be also noted that the program information 357 includes a segment for error counting, a segment to delineate which areas of the medium are adapted for oral student response, a segment to enable automatic playback, and a segment to co-act with the repeat keybutton 362 in a manner identical to that described with respect to the teaching machine 10 of FIGS. 1–6.

When the student is finished with the visual and audio information associated with the film frame 369 displayed on the screen 371, he depresses the next keybutton 364 which effects an index of the medium 351 with respect to the teaching machine 350. Also, the recording head (not shown) is then returned to the initial position whereby the indicator 375 is adjacent to the numbered keybutton 353 labeled "1."

An additional feature that can readily be incorporated into the teaching machine 350 is an automatic programmed branch from one frame of information to another. For example, the student would be presented with a problem to which he would respond by depressing one of the lettered keybuttons 355. This would effect indexing of the audio recording head (not shown) as indicated by indicator 375 with respect to the medium 351 to an audio reinforcement area. It would also set a latch circuit (not shown) which would "remember" that a programmed index had just been effected. Upon the completion of the playback of the reinforcement, as indicated by the dropping of the run magnet 219 of FIG. 6a, four additional tracks of program information 376 (only one of which is shown) located on the medium are sampled under control of the latch circuit to see if the programmer desired that another frame of information be presented. Automatic actuation of the next keybutton 364 is thereafter effected under the control of the circuit 377 until the desired frame is presented.

Referring now to FIG. 8 of the drawings, a schematic block diagram of the circuit 377 of FIG. 7 is depicted. As described, depression of a lettered keybutton 355 of FIG. 7 sets the latch circuit 378. Thereafter, when neither the variable index magnet 249 nor the run magnet 219 of FIG. 6a remain actuated, coincidence circuit 379 provides a gating signal to the counter 380.

When the counter 380 is gated, it samples the output signals of each of the four brushes (not shown) associated with the program information 376 of FIG. 7. The brushes are mounted to the recording head carriage in the same manner as the brushes asociated with the program information 357. Each such brush output signal sets one stage of the counter. Thereafter, the counter provides a number of output signals to the clutch 368 corresponding to the number stored therein. An additional signal is supplied to coincidence circuit 381 which is also gated with a signal indicating that a carriage position contact switch is open. The switch (not shown) is closed when the carriage (not shown) assumes an initial position so that the indicator 375 of FIG. 7 is adjacent the numbered keybutton 353 labeled "1." The output signal of the coincidence circuit 381 turns on the carriage motor 157 of FIG. 6a in order to position the carriage to its initial position. When the counter 380 reaches a count of zero, the latch circuit 378 is reset and the medium is positioned at the desired frame.

As is apparent to those skilled in the art, various forms of medium indexing could readily be incorporated into the teaching machine 350 of FIG. 7. For example, each frame of information could have a unique sequential number asociated therewith which would be read into a register when that frame was presented to the viewing station. Thereafter, the number stored in the counter described above would be compared with the number in the register. If the counter number were higher, the medium would be indexed in a forward direction until the number in the register compared equally with the number in the counter. If the counter number were lower, indexing would be effected in a reverse direction.

Referring now to FIG. 9 of the drawings, a still further embodiment of the teaching machine of the present invention is depicted. The teaching machine 385 utilizes a card medium 387 similar to the card medium 15 described with respect to FIG. 2 and differs only in that it contains a series of sprocket holes (not shown) along its edges. The card medium 387 is stacked one on another in stack 389 within the cartridge 391. The cartridge 391 contains a platform (not shown) having projections 393 and 394 and two other projections (not shown) extending therefrom. Each of the projections contain holes therein through which shafts 396, 397, 398, and 399 are adapted to fit through. Also mounted onto the shafts 396–399 are compression springs 401 and 402 and two springs (not shown). The shafts 396 to 399 are fixedly secured to the teaching machine 385.

When it is desirous to load the cartrdige 391 into the teaching machine 385, the holes in the projections 393 and 394 are threaded through the shafts 396 and 397 as are similar projections (not shown) which are threaded through the shafts 398 and 399. The cartridge is then forced down so as to compress the springs 401 and 402 and the springs (not shown) positioned on the shafts 398 and 399. A mechanical latch (not shown) is caused to latch down over a lip (not shown) to thereby retain the cartridge in its position in the teaching maching 385. The springs 401 and 402 act against the projections 393 and 394 to force the platform (not shown) connected to the projections in an upward direction. The stack 389 of card medium 387 which rests on the platform is also forced upwardly against the surfaces 404 and 405 of the cartridge 391. With the cartridge thus positioned, the stack 389 of card medium 387 is ready to be top fed into the teaching machine 385.

In order to accomplish the feeding of the upper-most card medium 387 in the stack 389, the card keybutton 409 is depressed by the operator. Depression of the card keybutton forces its associated actuator 411 downward thereby causing member 413 to pivot about pivot 415 in a counterclockwise direction is viewed. Member 413 then exerts an upward force on the spring clutch stop 417 which then pivots about pivot 419 in a clockwise direction as viewed. The pivoting spring clutch stop causes the spring clutch 421 to engage thereby connecting the continuously rotating drive pulley 423 to an output cam shaft (not shown) on which cam 425 is mounted. A picker knife carrier 427 is pivotly mounted about pivots 428 and 429 and biased by spring 430 to rotate in a clockwise direction as viewed. Thus, as cam 425 rotates, the cam follower 432 follows the dwell of the cam 425 causing the picker knife carrier 427 to rotate in a clockwise direction. A picker knife (not shown) mounted to the picker knife carrier, forces the top most card medium 387 to move in the direction of arrow 434.

As the card medium 387 resting on top of the stack 389 is fed in the direction of arrow 434, it comes into contact with the continuously rotating drive roller 436 which drives the card medium through the curved guide member 438 which forms an integral part of the teaching machine 385. The medium follows a curved path in the curved guide member 438 and comes to rest against pin wheel 440 and another similar pin wheel located on the same shaft (not shown). The card media thus positioned is depicted by medium 387(A). Thereafter, the medium 387(A) is pulled through the curved guide member 438 by the pin wheels when the pin wheels are caused to be rotated. A magnetic recording head (not shown) responsive to the head drive pulley 441 escapes back and forth across the medium in a direction perpendicular to the direction of arrow 434. The magnetic head and a head carrier (not shown) are similar to that described with respect to FIG. 3. When the recording head reaches the extreme of its motion, escapement pawls (not shown) are operated in the manner similar to that described with respect to the escapement pawls 113 and 115 of FIGS. 3 and 4. These escapement pawls operate on an escapement pinion (not shown) mounted on a common shaft with the pin wheel 440. This enables the pin wheel 440 to rotate through a fixed angle thereby driving the card medium a fixed distance through the curved guide member 438. In this manner, an audio recording and playback pattern similar to that described with respect to the medium 15 of FIG. 2 is effected. Drive gear 442 transmits the rotary motion to the pin wheel 440 from the motor 443. The motor 446 supplies power to the drive pulley 423 which controls the picker knife carrier 427, to the drive pulley 448 which effects rotation of the drive roller 436, and the head drive pulley 441.

As the card medium 387(A) is pulled through the curved guide member 438, it is fed into a slot (not shown) in the cartridge 391. The cartridge is provided with two such slots located at its opposite ends, slot 450 and the slot not shown. These slots are located midway between the upper most and lower most surface of the cartridge 391. The stack 389 of card media 387 is short enough to insure that the projections 393 and 394 and the platform (not shown) to which the projections are attached and on which the stack 389 rests, are located above the center of the cartridge when it is loaded into the teaching machine 385. Thus, as the card medium 387 is fed into the slot (not shown) it falls toward the bottom of the cartridge 391. The card medium 387 continues to be fed through the curved guide member 438 until the student depresses the card keybutton 409 or until a special end-of-card indication is sensed. At this time, both of the escapement pawls (not shown) are released and the card is continuously driven by the pin wheel 440 thereby imparting sufficient inertia to the card medium 387(A) so that it clears the curved guide member 438 and completely enters into the cartridge 391. The special end-of-card indication is placed on each card to indicate that the end of the card is approaching or that no further information is located on the card medium. This indication can be in the form of a conductive program segment similar to those previously described.

The teaching machine 385 is provided with a plurality of keybuttons including lettered keybuttons 451, a repeat keybutton 452, a listen keybutton 453, a talk keybutton 454, and a stop keybutton 455. These keybuttons co-act with programming information located on the medium in the same manner that the corresponding keybuttons of the teaching machine 10 co-act with the medium 15 of FIGS. 1–6. The programming information on the card medium 387 is in the same form as the programming information 51 located on the card medium 15 of FIG. 2. An index keybutton 457 is also provided to effect the index of the card medium 387(A) in a forward direction through the curved guide member 438, the distance of the index being controlled by a special program strip (not shown) located on the card medium. In a similar manner, the repeat keybutton 452 effects a reverse index in the opposite direction in accordance with programming information (not shown) located on the medium 387(A). An eject keybutton 459 is also provided to eject the cartridge 391 from the teaching machine 385. This keybutton merely releases the latch (not shown) which holds the cartridge 391 in the teaching machine so that the springs 401 and 402 act on the projections 393 and 394 to push the entire cartridge 391 upward.

Once the student has depleted the stack 389 of card media 387 he depresses the eject keybutton 459, removes the cartridge 391, and inserts an additional cartridge of card media. The spent cartridge may thereafter be turned over so that its bottom surface becomes the top surface, rotated 180° about an axis through its center and be ready for reinsertion into the teaching machine 385. In this manner, the card media 387 remains in its proper sequence without necessitating student or teacher intervention in reinserting the cards into the cartridge 391. It is important that the cards remain in their fixed sequence inasmuch as the audio information on the preceding card corresponds to the visual information on the succeeding card. That is, the audio and programming information on the card medium 387(A) corresponds to the visual indicia presented by the top most card medium 387 of the stack 389.

A further feature of the teaching machine 385 is the utilization of a stationary digital recording head 461 which is independent of the audio recording head (not shown) and which records digital information onto the card medium as the card medium moves relative to the digital recording head 461.

The recording head 461 has associated therewith a read gap 462 and a write gap 463. As the medium 387(A) moves through the curved guide member 438, it passes under the digital recording head 461 so that it first passes under the write gap 463 and then under the read gap 462. A series of digital characters are recorded along a single track of the medium 387 (A) which is adjacent to and perpendicular to the audio information recorded on the medium. As the media 387(A) moves through the curved guide member 438, the characters prerecorded on the digital information track are sensed at the read gap 462 of the digital recording head 461.

In operation, when the student depresses one of the lettered keybuttons 451, the card medium 387(A) is caused to be indexed past the digital recording head 461 in accordance with the programming information located on the card medium and in accordance with the depressed keybutton. Additionally, the depression of the lettered keybutton 451 sets an electrical latch circuit (not shown), the output of which provides the gating signal. Each such lettered keybutton 451 has a corresponding electrical latch circuit associated therewith. As the card medium 387(A) passes the digital recording head 461 upon the depression of a lettered keybutton 451, the first pre-recorded character sensed by the read gap 462 is utilized in conjunction with the output of the electrical latch circuit (not shown) to gate the recording of a start character at the wrie gap 463 onto the card medium 387(A). As the card medium 387(A) continues its motion, the start character is sensed by the read gap 461. If the depressed lettered keybutton 451 corresponded to the keybutton labeled "A," the sensing of the start character at the read gap 461 would be utilized to start the recording of a response character at the write gap 463. If the depressed lettered keybutton 451 were the keybutton labeled "B," the sensing of the start bit at the read gap 461 would have no effect on the recording of a response character. Thereafter, during the continued motion of the card medium 387(A), the pre-recorded character following the start character would pass the read gap 462 and would be utilized to gate the writing circuit so as to record a response character at the write gap 463. In a similar manner, the second pre-recorded character located after the start character would be utilized to gate the response character if the lettered keybutton 451 labeled "C" were depressed. A simple character counter (not shown) utilized in conjunction with the electrical latch circuits (not shown) associated with each of the lettered keybuttons 451 can be utilized to generate the response character so that it is located an appropriate number of characters from the start character. The manner of digitally recording characters onto a medium utilizing a two-gap read-write head is described in detail in the aforereferenced co-pending application entitled, "Data Reading, Recording, and Positioning System."

When the student has completed answering all of the various multiple choice questions presented by the card medium 387(A) in conjunction with the visual material on the top most card medium 387 of the stack 389, his answers will have been recorded onto the card medium. Thereafter, the teacher can remove the card medium 387 from the cartridge 391 and insert it into a magnetic card reading system similar to that described in the aforereferenced co-pending application entitled, "Data System With Printing, Composing, Communications, and Magnetic Card Processing Facilities." This device would print out the student responses which would enable the teacher to grade the student or to select future material to be taught to the student. It should be noted that the response device is basically cheat proof inasmuch as the only previously recorded characters that are erased are those which are recorded over upon the depression of a lettered keybutton 451. Thus, if the student were to depress the lettered keybutton 451 labeled "A," and thereafter reposition the card medium 387(A) by, for example, depressing the repeat keybutton 462, and further thereafter, depress the correct letter keybutton 451 for example, the one labeled "B," both the first response and the second response would be recorded on a card medium. Thus, the student has no way to eliminate the first response.

OPERATION

Referring now to FIG. 1 of the drawings, the operation of the teaching machine of the present invention will be described. The student is provided with a stack of card media 15 arranged in a predetermined sequence. On one side of the card medium 15 appears visual indicia 23 and on its opposite side, as shown in FIG. 2, appears audio information 49 and program information 51. The medium is inserted into the opening 17 of the teaching machine 10. Indicator 41 indicates the position of the audio recording and reproducing head (not shown) with respect to the medium. The audio information prerecorded on the reverse side of the medium 15 generally correlates with the visual indicia on its opposite side. For example, the audio information relating to the visual indicia 23(A) would be located on the underside of the medium 15 directly under the visual indicia 23(A). In a similar manner, the audio information relating to the visual indicia 39 and 23(B) would be located directly under that visual indicia on the reverse side of the medium 15. In some instances, however, the physical position of the audio information is unrelated to the visual indicia. For example, the audio information relating to the visual indicia 23(C) may be located directly under the visual indicia 23(A).

Referring now to FIG. 2 of the drawings, program information 51 is located on side 53 of the medium and is in the form of conductive ink patterns printed on the surface of the medium. Two such patterns are depicted, although it is understood that there are eight such patterns on the medium. Four of the conductive patterns are associated with the multiple choice lettered keybuttons 25 of teaching machine 10 of FIG. 1 and the other four conductive patterns are associated respectively with the listen mode of operation, the talk mode of operation, a repeat mode of operation, and an error counter.

Referring again now to FIG. 1 of the drawings, sensing brushes (not shown) which are aligned with indicator 41 and hence with the audio recording head (not shown) travel with the audio recording head as it moves with respect to the medium 15. The brushes sense the program information on the reverse side of the medium 15. The student may start the machine by depressing the listen keybutton 31. Thereafter, the audio recording head (not shown) will move back and forth across the medium and play back sound as long as the sensing brush (not shown) associated with the listen mode conductive pattern senses a conductive pattern. When it ceases to sense such a pattern, or when the student depresses the stop keybutton 33, audio playback ceases. Thereafter, the student may again depress the listen keybutton 31 in order to hear further previously recorded information or he may depress the talk keybutton 35 to record his own voice into the microphone 43. Recording onto the medium by the student can be effected only when the sensing brush (not shown) associated with the talk mode conductive program segment senses a conductive pattern. This allows the student to record on only those areas of the medium which the programmer desires to allow him to record on. Whenever the student depresses the repeat keybutton 29, the audio recording head indexes in a reverse direction by an amount determined by the programmer. That is, the reverse indexing mechanism is activated only as long as the sensing brush (not shown) associated with the repeat mode conductive segment senses a conductive pattern.

As mentioned heretofore, the student may respond to multiple choice questions by depressing one of the lettered keybuttons 25. Depression of such a keybutton causes the audio recording head (not shown) as indicated by indicator 41 to index to a reinforcement area. Each of the lettered keybuttons has associated therewith a program segment. The mechanism which effects indexing is activated only as long as the sensing brush (not shown) associated with the depressed lettered keybutton 25 senses a conductive pattern on the program segment associated with the depressed lettered keybutton.

The numbered keybuttons 27 enable the student to effect fixed indexing of the audio recording head (not shown) as indicated by indicator 41 to a position adjacent the depressed numbered keybutton 27. Thus, if the student upon his own volition desired to hear the audio information corresponding to the visual indicia 39, he would depress the numbered keybutton 27 labeled "6."

The teaching machine 10 is particularly adapted to present multiple choice type programs, construction programs, and voice programs. The three types of programs may be intermixed in such a manner that all three types of programs may be presented by the same card medium 15. An example of each of the programs will follow:

Multiple choice

Once the card medium 15 is in place in the teaching machine 10, the student would depress the listen keybutton 31. Thereafter, the student would hear audio information corresponding to the visual indicia 23(A) and be presented with an audio question. The student would thereafter respond by depressing one of the lettered keybuttons 25. Depression of the lettered keybutton 25 would cause the audio recording head (not shown) to move with respect to the medium 15 to an audio reinforcement area corresponding to the depressed keybutton. This movement would be indicated to the student by indicator 41. Thereafter, the student would be presented with the audio reinforcement for the selected answer and would be told to depress one of the numbered keybuttons 27. Depression of the numbered keybutton 27 would effect indexing of the audio recording head (not shown) with respect to the medium as indicated by indicator 41 to a position adjacent the depressed numbered keybutton. Thereafter, audio information corresponding to the visual indicia 23 adjacent the depressed numbered keybutton 27 would be presented either automatically or upon student initiation by depressing the listen keybutton 31. The student, at any time, can depress the stop keybutton 33 and thereby stop the playback of audio information.

Construction programs

The student would insert the card medium 15 into teaching machine 10 and thereafter depress the listen keybutton 31. The audio information would describe a construction task which the student is to perform with related materials. The visual indicia 23 would depict aspects of the task to be performed. Upon the completion of the audio information, audio playback will halt and the student would complete the assigned task. Thereafter, the student would depress the listen keybutton 31 and the audio playback thereafter effected would describe the next task be completed or could present the student with a question relating to the task just accomplished. In this latter instance, the teaching machine 10 would function as described above with respect to the multiple choice question to effect a programmed index to an appropriate reinforcement area in accordance with the student's response. The numbered keybuttons 27 which effect fixed indexing can also be utilized by the student to repeat repetitive steps. Additionally, the programmer can program the medium so that when the student depresses the repeat keybutton 29, only the audio information associated with the task to be performed will be reheard.

Voice programs

In this mode of operation, the student would depress the listen keybutton and hear a pre-recorded message. Thereafter, the student would depress the talk keybutton 35 and record a message onto the medium 15 via the microphone 43. The student would thereafter depress the repeat keybutton 29 and thereafter depress the listen keybutton 31 to hear his own spoken message. Since the student can stop the playback of his own spoken message at any point under the control of the listen key 31, he could stop playback of his own message at any point and thereafter record over a portion of his previous response by depressing the talk keybutton 35.

In the description which follows, the operation of the various mechanisms and circuits of the teaching machine 10 which effect recording, playback, variable indexing and fixed indexing will be described. Referring now to FIG. 3 of the drawings, a perspective view partially in section of the teaching machine 10 of FIG. 1 is depicted. This view depicts the audio recording head 85, the sensing brushes 161 and 163 which sense the conductive segments on the medium (not shown), and the indicator 41, all of which are mounted to the carriage 139. The magnetic head 85 is mounted to the head carrier 89 which is driven back and forth by the lead screw 97. When the head carrier 89 reaches an extreme of its motion on the lead screw, it effects motion of push rod 109 which acts on the pawls 113 and 115 of FIG. 4 to thereby effect escapement of the carriage 139 in the direction of arrow 145.

Rapid motion of the carriage 139 in the direction of arrow 145 is effected when both of the pawls 113 and 115 of FIG. 4 are removed from the escapement rack 117. With both pawls thus removed, the spring motor 153 acting through cable 155 exerts a force on the carriage 139 to move it in the direction of arrow 145. Rapid motion of the carriage 139 in the direction of arrow 147 is effected by energizing motor 157 mounted onto the carriage 139 which effects rotation of the drive roller 159.

Rapid motion of the carriage 139 in direction of arrows 145 and 147 is effected upon the depression of a numbered keybutton 27 or upon the depression of a lettered keybutton 25. Depression of a numbered keybutton 27 causes the carriage 139 to advance so that the position of the indicator 41 is adjacent the depressed numbered keybutton. Depression of a lettered keybutton 25 causes the carriage 139 to advance until the brush 163 associated with the depressed lettered keybutton no longer senses a conductive programmed segment on the medium (not shown).

Referring now to FIG. 5, a cross sectional view of the numbered keybutton 27 is depicted. Depression of a numbered keybutton 27 causes the camming surface 171 of the key stem 167 to act on the latch bar 173 so that it pivots in a clockwise direction about pivot 175. This motion effects the release of any previously latched down numbered keybutton 27. Thereafter, the latching bar acts against the camming surface 179 of the key stem 167 to hold the depressed numbered keybutton 27 down.

Referring now to FIG. 6a, the circuitry which is responsive to the programmed segments on the medium (not shown) to effect motion of the magnetic recording head (not shown) with respect to the medium are depicted. Depression of the listen keybutton 31 or the talk keybutton 35 of FIG. 3 effects closure of switches 31' and 35' thereby completing the circuit to the run magnet 219. A circuit to the run magnet 219 is also completed when the brush 161(A) senses a conductive segment 201 on the medium. Picking of the run magnet causes the motor 98 to drive the magnetic head (not shown) back and forth in its recording or reproducing pattern.

In order to effect variable indexing, one of the lettered keybuttons 25 of FIG. 1 is depressed by the student which causes a corresponding switch 25(A) to 25(D) to close. Closure of one of these switches picks the variable indexing magnet 249 which effects the deenergization of the run magnet 219 and thereafter causes the pawl magnet 211 to pick. The pawl magnet 211 remains picked until the brush 163(A) to 163(D) corresponding to the depressed keybutton no longer senses a conductive segment on its associated conductive program segment, block 205–208.

Referring now to FIG. 6b, the circuitry which effects indexing under the control of the numbered keybuttons 27 is depicted. Depression of a numbered keybutton 27 closes corresponding contacts 27' which energizes all of the reverse segments of the printed circuit 109(A) associated with keybuttons having numerical orders higher than that of the depressed numbered keybutton and all of the segments of the printed circuit 189(D) associated with numbered keybuttons of a lower order than that of the depressed numbered keybutton. Brushes 187 which are physically connected with the head carriage transfer the voltage from the energized segments to either the reverse common printed circuit 189(B) or the forward common printed circuit 189(C) in accordance with its relative position with respect to the printed circuits 189. The output voltage from the printed circuits 189(B) and 189(C) is utilized to effect movement of the carriage (not shown) and hence the brushes 187 by actuating the motor 157 and the pawl magnet 211 of FIG. 6a.

Referring now to FIG. 7 of the drawings, an alternate embodiment of the teaching machine of the present invention is depicted. This teaching machine is similar to the teaching machine 10 depicted with respect to FIGS. 1 to 6, but utilizes a different form of medium 351. The medium 351 contains film frames 369 which are projected on the screen 371. Each such film frame and its corresponding audio information and programming information corresponds to a single card medium 15 of FIG. 1. By depressing the next keybutton 364, clutch 368 is energized which effects the driving of the medium 351 by a sprocket wheel 365 to the next frame. A special coded program segment 376 can also be utilized in conjunction with the medium to cause automatic operation of the next keybutton 364 for a predetermined number of times in accordance with the coded information 376. Thus, when the student is presented with a multiple choice question he would depress one of the lettered keybuttons 355 which would cause the audio recording head (not shown) to move as indicated by indicator 375 with respect to the stationary medium to an audio reinforcement area. Upon the completion of the audio playback, the programmed information 376 would be sensed to determine whether the medium 351 should be automatically advanced with respect to the teaching machine 350. Additionally, the programmed information 376 would indicate how far the medium is to be advanced. Thereafter, the medium would be indexed to the desired frame of information.

Referring now to FIG. 9, a still further alternate embodiment of the teaching machine of the present invention is depicted which incorporates a cartridge feed. A cartridge 391 containing a stack 389 of card media 387 is inserted into the teaching machine 385. A picker knife carrier 427 is activated upon student depression of the card keybutton 409 to effect feeding of a card medium 387(A) into the curved guide 438. Thereafter, an audio recording head (not shown) is moved in a direction perpendicular to the direction of arrow 434 across the card medium. When the audio recording head reaches the extreme of its motion, the card medium 387(A) is indexed with respect to the audio recording head.

A digital recording head 461 is utilized to record student responses to mulitple choice questions. When the student depresses one of the lettered keybuttons 451, the card medium 387(A) is indexed by a fixed increment in accordance with the programming information located on the card medium 387(A) and in accordance with the depressed keybutton. At this time, digital information is recorded on the medium indicating which keybutton is depressed.

In the description of the teaching machine of the present invention as described by the various embodiments thereof, it can be seen that the audio recording and reproducing head can be indexed with respect to the medium or that the medium can be indexed with respect to the audio recording and reproducing head. If it is desirous to incorporate the digital recording head 461 of FIG. 9 into the teaching machine 10 of FIG. 1, it would only be necessary to attach the digital recording head to the carriage 139 of FIG. 3. Further, the special program segment utilized to effect indexing of the medium in the teaching machine of FIG. 7 could be utilized in conjunction with the teaching machine of FIG. 9 to effect a predetermined number of card feeding cycles.

In the above description, a particular back and forth motion of the recording head with respect to the medium in order to reproduce and record sound has been described. It is obvious to those skilled in the art that various recording patterns could be utilized without departing from the spirit and scope of this invention. Additionally, various forms of programming information can be incorporated into the medium and various detecting schemes can be used in conjunction therewith. For example, holes could be cut in the medium which would act in the same manner as the conductive patterns act or visual information or pre-recorded tones could be encoded into the medium to control motion during indexing. Capacitive sensing as well as optical sensing of the information could be utilized in lieu of the contact wipers. An additional modification that could be incorporated into the teaching machine of the present invention would be to provide an indexable scanning lever in lieu of the numbered keybuttons 27 of FIG. 1. That is, a scanning lever adapted to be moved by the student to various defined positions could be utilized to effect indexing of the recording head with respect to the medium to corresponding fixed positions.

While the invention has been particularly shown and described with reference to preferred embodiments thereof, it should be understood by those skilled in the art, that the foregoing and other changes in form and detail may be made therein without departing from the scope of the invention.

What is claimed is:

1. A teaching machine for presenting learning material in the form of questions and reinforcements for selected answers comprising:

support means adapted to receive and support a medium, said medium having thereon said learning material in the form of correlated visual indicia, program information, and aural information, said support means providing a viewing area for displaying the visual indicia of the medium;

actuable audio reproducing means for sensing the aural information on the medium and for producing sound signals corresponding to the aural information;

sensing means for sensing the program information on the medium and for providing output signals indicative of the sensed information, said program information specifying reinforcement material in accordance with selected answers and for specifying machine operating conditions;

carriage means for supporting the audio reproducing means and the sensing means and having means associated therewith for indicating the relative position of the carriage means with respect to the medium, said means being located adjacent to the viewing area;

actuable switch means for providing a start signal;

actuating means responsive to said start signal and the output signals of the sensing means for actuating the audio reproducing means;

drive means for effecting relative motion between the carriage and the medium;

a first and a second plurality of actuable keys, said first plurality of keys being actuable for indicating answers to questions represented on said medium;

variable indexing means responsive to the actuation of one of the first plurality of keys and to the output signals of the sensing means for actuating the drive means for a duration specified by the output signals of the sensing means;

a plurality of position defining means fixedly secured to the support means for defining a series of relative positions of the medium with respect to the carriage, each of said second plurality of keys corresponding to a unique one of said series of relative positions;

position indicating means fixedly secured to the carriage and adapted to coact with the position defining means for providing an indication whenever the medium and the carriage are located with respect to each other at one of said series of relative positions;

fixed indexing means responsive to the actuation of one of said second plurality of keys and to said position indicating means for actuating said drive means until the relative position of the medium and the carriage correspond to the unique one of said series of relative positions corresponding to the actuated key.

2. The teaching machine set forth in claim 1 further comprising:

a second actuable drive means for driving said medium with respect to said carriage;

actuable switch means for actuating said second drive means;

said first mentioned drive means being responsive to the variable indexing means and to the fixed indexing means to move the carriage relative to the medium and being responsive to the actuation of the second drive means to move the carriage relative to the medium to a predefined relative position.

3. A teaching machine for presenting learning material in the form of questions and reinforcements for selected answers comprising:

support means adapted to receive and support a medium, said medium having thereon said learning material in the form of correlated program information and aural information;

actuable audio reproducing means for sensing the aural information on the medium and for producing sound signals corresponding to the aural information.

sensing means for sensing the program information on the medium and for providing output signals indicative of the program information, said program information specifying reinforcement material in accordance with selected answers and specifying machine operating conditions;

carriage means for supporting the audio reproducing means and the sensing means;

actuable switch means for providing a start signal;

a first plurality of actuble keys for indicating answers to questions represented on said medium;

control means responsive to the start signal and to the output signals of the sensing means for providing an actuating signal to the audio reproducing means;

drive means for effecting relative motion between the carriage means and the medium;

variable indexing means responsive to the actuation of one of the first plurality of keys and to the output signals of the sensing means for effecting an indexing cycle and enabling the drive means for a time duration specified by the output signals of the sensing means and for providing a resettable output signal, said signal being indicative of the completion of an indexing cycle;

second indexing means responsive to the output signals of the sensing means, to the actuating signal of the control means, and to the output signal of the variable indexing means for activating said drive means for a time duration specified by the output signals of the sensing means whenever the output signal of the variable indexing means is present and the actuating signal of the control means is not present and for resetting the output signal of the variable indexing means after the drive means has been thus activated.

4. The teaching machine set forth in claim 3 wherein the drive means comprises:

a first drive means actuable by the variable indexing means for moving the carriage with respect to the medium, and a second drive means actuable by the second indexing means for moving the medium with respect to the carriage.

5. The teaching machine set forth in claim 3 having recording means responsive to the sensing means and to the actuation of one of the first plurality of keys for recording an error indication in accordance with the output signals of the sensing means.

6. The teaching machine set forth in claim 3 further comprising:

a series of position defining means defining a fixed plurality of relative positions of the carriage means and the medium with respect to one another;

a second plurality of keys, said each of said keys corresponding to a unique one of said series of relative positions;

fixed indexing means responsive to said position defining means and to the actuation of one of said second plurality of keys for actuating said drive means and for thereafter deactuating said drive means when the relative position of the carriage and medium with respect to one another corresponds to the relative position defined by the actuated key, and wherein the medium contains visual indicia corresponding to the audio information and to the program information and located in a fixed position with respect thereto and having a portion thereof adjacent to the second plurality of actuable keys.

7. The teaching machine set forth in claims 1, 3, or 6 further comprising reverse index means responsive to the actuation of a predetermined one of said first plurality of actuable keys and to the output signals of said sensing means for activating the drive means for moving the carriage with respect to the medium in a direction opposite that effected by the variable indexing means for a time duration specified by the output signals of the sensing means.

8. A teaching machine for presenting learning material in the form of questions and reinforcements for selected answers comprising:

a cartridge having supporting means for supporting a stack of media so that the topmost medium of the stack is visible, each of said media of said stack having thereon said learning material in the form of visual indicia on its uppermost surface and aural information and program information on its opposite surface, the aural and program information on each of the media corresponding to the visual indicia on each of the media succeeding it in the stack of media;

means adapted to receive said cartridge;

actuable audio reproducing means for sensing the aural information on the medium and for producing sound signals corresponding to the aural information:

sensing means for sensing the program information on the medium and for providing output signals indicative of the information, said program information specifying reinforcement material in accordance with selected answers and for specifying machine operating conditions;

carriage means for supporting the audio reproducing means and the sensing means, said carriage means defining an audio reproducing station;

means for feeding the topmost medium of the stack of media to the audio reproducing station;

actuable switch means for providing a start signal;

a first plurality of actuable keys for indicating answers to questions represented on said medium;

drive means responsive to the start signal and to the actuation of one of said keys for driving the medium past the audio reproducing station for a duration determined by the output signals of the sensing means;

means for turning the medium over and ejecting the medium into the cartridge at a position located under the support means.

9. The teaching machine set forth in claims 1, 3, or 8 further comprising digital recording means mounted for relative motion with respect to said medium, said digital recording means being responsive to the actuation of one of said first plurality of keys for recording a unique signal corresponding to the actuated key onto the medium.

10. The teaching machine set forth in claims 1, 3, or 8 further comprising:

an audio transducer for transducing sound into electrical signals;

actuable audio recording means responsive to the electrical output signals of the transducer for recording aural information onto the medium;

actuating means responsive to the sensing means for actuating said audio recording means.

References Cited

UNITED STATES PATENTS 3,353,280  11/1967  Emde _____ 35—9
3,383,781  5/1968  Diuzet _____ 35—9

WILLIAM H. GRIEB, Primary Examiner